(12) United States Patent
Miyazaki et al.

(10) Patent No.: US 8,131,309 B2
(45) Date of Patent: Mar. 6, 2012

(54) RADIO COMMUNICATION SYSTEM, BASE TRANSCEIVER STATION, AND EXTENSION DEVICE

(75) Inventors: Nao Miyazaki, Kawasaki (JP); Masanori Hashimoto, Kawasaki (JP); Hidekazu Kuniyoshi, Kawasaki (JP); Yasuo Tezuka, Kawasaki (JP); Kayo Motohashi, Kawasaki (JP); Satoshi Maruyama, Kawasaki (JP); Takashi Kanda, Kawasaki (JP); Tadanori Yokosawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1001 days.

(21) Appl. No.: 11/455,960

(22) Filed: Jun. 20, 2006

(65) Prior Publication Data
US 2007/0232353 A1    Oct. 4, 2007

(30) Foreign Application Priority Data
Mar. 29, 2006 (JP) ................................. 2006-092227

(51) Int. Cl.
*H04B 7/00* (2006.01)
*H04M 1/00* (2006.01)
*H04W 4/00* (2009.01)

(52) U.S. Cl. .................. 455/465; 455/500.1; 455/553.1; 370/328; 370/338

(58) Field of Classification Search .................. 455/465, 455/557; 370/338, 328
See application file for complete search history.

(56) References Cited

U.S. PATENT DOCUMENTS

| | | | | |
|---|---|---|---|---|
| 2001/0018350 | A1* | 8/2001 | Hachimura et al. | 455/462 |
| 2003/0076803 | A1* | 4/2003 | Chuah | 370/338 |
| 2005/0026634 | A1* | 2/2005 | Raghavan et al. | 455/465 |
| 2006/0002332 | A1* | 1/2006 | Diaz Cervera et al. | 370/328 |
| 2008/0037558 | A1* | 2/2008 | Kawakami | 370/395.53 |

FOREIGN PATENT DOCUMENTS

EP    1 737 256    12/2006

OTHER PUBLICATIONS

3GPP Release5 Technical Specification TS25.331, TS253413, TS25.433, The 3$^{rd}$ Generation Partnership Project (3GPP) http://www.3gpp.org/ftp/Specs/html-info/25-series.htm Retrieved Dec. 28, 2005.
European Search Report dated Aug. 6, 2007, from the corresponding European Application.

* cited by examiner

*Primary Examiner* — George Eng
*Assistant Examiner* — Nizar Sivji
(74) *Attorney, Agent, or Firm* — Katten Muchin Rosenman LLP

(57) ABSTRACT

A plurality of base transceiver stations and at least one extension device are connected, via an IP network that uses internet protocol. The extension device shares resources of the base transceiver stations by arbitrary changing a connection relationship between the base transceiver stations and the extension devices. When a mobile terminal communicates with a core network, the extension device uses the resources of at least one base transceiver stations according to fluctuation in the amount of traffic.

15 Claims, 18 Drawing Sheets

RADIO COMMUNICATION SYSTEM, BASE TRANSCEIVER STATION, AND EXTENSION DEVICE

CROSS-REFERENCE TO RELATED APPLICATIONS

This application is based upon and claims the benefit of priority from the prior Japanese Patent Application No. 2006-092227, filed on Mar. 29, 2006, the entire contents of which are incorporated herein by reference.

BACKGROUND OF THE INVENTION

1. Field of the Invention

The present invention relates to a radio communication system, a base transceiver station, and an extension device.

2. Description of the Related Art

FIG. 17 is a schematic of a conventional mobile radio communication system. As shown in FIG. 17, in the conventional system, a plurality of radio network controllers (RNC) 2 are connected to a core network (CN) 1. A plurality of base transceiver stations (BTS) 3 are connected to each of the radio network controllers 2. Each of the base transceiver stations 3 is disposed in each service area 4.

An optical extension device 6 is disposed in areas 5 that cannot be covered by an ordinary base transceiver station 3. The optical extension device 6 has a parent-child relationship with existing base transceiver stations 3. The optical extension device 6 performs radio communication with a mobile station (user equipment (UE), also referred to as a mobile terminal). A wide transmission bandwidth is required between the base transceiver station 3 and the optical extension device 6, controlled by the base transceiver station 3. Therefore, the base transceiver station 3 and the optical extension device 6 are interconnected by an optical cable.

When the optical extension devices 6 are connected to the base transceiver station 3 that is the parent, the optical extension devices 6 that have the same base transceiver station 3 as the parent can share resources of the base transceiver station 3 that is the parent. However, the optical extension devices 6 cannot share the resources of another base transceiver station 3 that is not the parent. When the optical extension devices 6 are not connected, the resources of the base transceiver station 3 are fixed to the base transceiver station 3 and are not shared with other base transceiver stations 3.

FIG. 18 is a schematic of a base transceiver station and an optical extension device in a conventional mobile radio communication system. The conventional base transceiver station 3 includes an interface unit (IF) 11, a base band processing unit (BB) 12, a spreading processing unit (SP) 13, a receiving unit (RX) 14, an optical interface unit (IF) 15, and a control unit 16. The interface unit 11 is for the radio network controller 2. The base band processing unit 12 performs an encoding process on transmission data and a reverse-spreading and decoding process on reception data. The spreading processing unit 13 performs a spreading process on the transmission data. The receiving unit 14 performs a reception process on the reception data. The optical interface unit 15 is for the optical extension device 6. The control unit 16 controls the overall base transceiver station 3.

The optical extension device 6 includes an optical interface (IF) 17 and a radio transceiving unit (TRX) 18. The optical interface 17 is for the base transceiver station 3. In other words, in the conventional system, spreading-processed data is transmitted between the base transceiver station 3 and the optical extension device 6. As a result, the transmission bandwidth between the base transceiver station 3 and the optical extension device 6 is widened.

The base band processing unit 12 is provided in the form of a card (hereinafter, "BB card") that can be attached to and removed from the base transceiver station 3. One BB card has a plurality of resources. Each resource is assigned by a channel. Each terminal uses the resources in the base transceiver station 3 and is connected to the core network 1. A sufficient number of BB cards to process a maximum number of terminals expected to be connected is mounted onto each base transceiver station 3.

Plural cells are assigned to each base transceiver station 3. A shared channel used in each cell is assigned to the resources of separate BB cards for each cell, and the assignment is fixed. At the same time, assignment of an individual channel used by each terminal is not limited to the BB card to which the shared channel of the cell, in which the terminal is present, is assigned. The individual channel can be assigned to the resources of a BB card to which the shared channel of another cell of the same base transceiver station 3 is assigned.

Generally, the total number of the resources in each base transceiver station 3 is less than a theoretical maximum storage capacity of one cell (about 80 resources, determined by signature and taking into consideration handovers from other cells). The control unit 16 performs processing, such as resource management and the assignment of the resource to the individual channel, based on instructions from the radio network controller 2.

According to the third generation partnership project (3GPP), various specifications related to a third generation mobile phone system are standardized. For example, specifications regarding a wireless interface between a mobile terminal and a universal mobile telecommunications system (UMTS) terrestrial radio access network (UTRAN), including the radio network controller 2 and the base transceiver station 3 that is controlled by the radio network controller 2, specifications regarding information transmitted between the radio network controller 2 and another radio network controller 2 or another system, specifications regarding an interface between the UTRAN and the core network 1, and specifications regarding an interface between the radio network controller 2 and the base transceiver station 3 are standardized (for example, "3GGP Release 5 Technical Specifications (TS) TS25.331, TS25.413, TS25.433", [online], The 3rd Generation Partnership Project (3GPP), [searched Dec. 28, 2005], the Internet URL: http://www.3gpp.org/ftp/Specs/html-info/25-series.htm).

In the conventional base station system, the resources are not shared among the base transceiver stations. Therefore, the resources cannot be flexibly assigned according to increases and decreases in traffic varied by time, day of the week, month, season, or the like, and sudden increases in traffic due to an event, a disaster, or the like. As a result, the base transceiver station cannot perform a requested call processing when the resources of the base transceiver station are insufficient for the increase in traffic, thereby leading to a reduction in service quality.

The increase in traffic can be handled by an addition of the BB cards to the base transceiver station with the increased traffic. However, an administrator is required to constantly monitor fluctuations in the traffic and to perform BB card addition operations, thereby leading to an increase in communication costs. At the same time, when the traffic decreases or an actual amount of traffic is less than an expected amount of traffic, operational efficiency of the base transceiver station decreases because the resources of the base transceiver station are not used and become redundant. This also leads to the increase in communication costs.

The resources of the base transceiver station can be assigned with some degree of flexibility in response to the increases and decreases in traffic, by the placement of the optical extension device. However, an optical cable is used to connect the base transceiver station and the optical extension device. Therefore, an area in which the optical extension device can be disposed is limited to an area in which the optical cable can be laid. Moreover, expenses are required to manage the optical cable, thereby leading to the increase in communication costs.

SUMMARY OF THE INVENTION

It is an object of the present invention to at least solve the above problems in the conventional technologies.

A radio communication system according to one aspect of the present invention includes a plurality of radio communication devices each of which has resources used to perform communication processing when a mobile terminal communicates with a core network; at least one extension device having a function of performing radio communication with the mobile terminal; and an internet protocol network, to which the radio communication devices and the extension device are connected, and in which a connection relationship between the radio communication devices and the extension device is arbitrarily changed. The extension device is configured to use the resources of more than one of the radio communication devices when the mobile terminal communicates with the core network.

A radio communication device according to another aspect of the present invention is used in the radio communication system according to the above aspect. The radio communication device includes an interface to connect the radio communication device to the internet protocol network; and a base band processing unit configured to perform an encoding process on transmission data and a decoding process on reception data.

A radio communication device according to still another aspect of the present invention is used in the radio communication system according to the above aspect. The radio communication device includes an interface to connect the radio communication device to the internet protocol network; a base band processing unit configured to perform an encoding process on transmission data and a decoding process on reception data; and a bypass processing unit to communicate with another radio communication device via the internet protocol network.

A radio communication device according to still another aspect of the present invention is used in the radio communication system according to the above aspect. The radio communication device includes an interface to connect the radio communication device to the internet protocol network; a base band processing unit configured to perform an encoding process on transmission data and a reverse-spreading process and a decoding process on reception data; a spreading processing unit configured to perform a spreading process on the transmission data; and a receiving unit configured to perform a reception processing on the reception data.

An extension device according to still another aspect of the present invention is used in the radio communication system according to the above aspect. The extension device includes an internet protocol interface to connect the extension device to the internet protocol network; a radio transceiving unit configured to perform radio communication with the mobile terminal; a spreading processing unit configured to perform a spreading process on transmission data; and a receiving unit configured to perform a reception process and a reverse-spreading process on reception data.

An extension device according to still another aspect of the present invention is used in the radio communication system according to the above aspect. The extension device includes an internet protocol interface to connect the extension device to the internet protocol network; and a radio transceiving unit configured to perform radio communication with the mobile terminal.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention will be explained in detail below with reference to the accompanying drawings. In the descriptions below, data transmitted from a core network to a terminal is transmission data, and data transmitted from the terminal to the core network is reception data. In each embodiment, same configurations are given the same reference numbers and redundant explanations are omitted.

Figure 1:
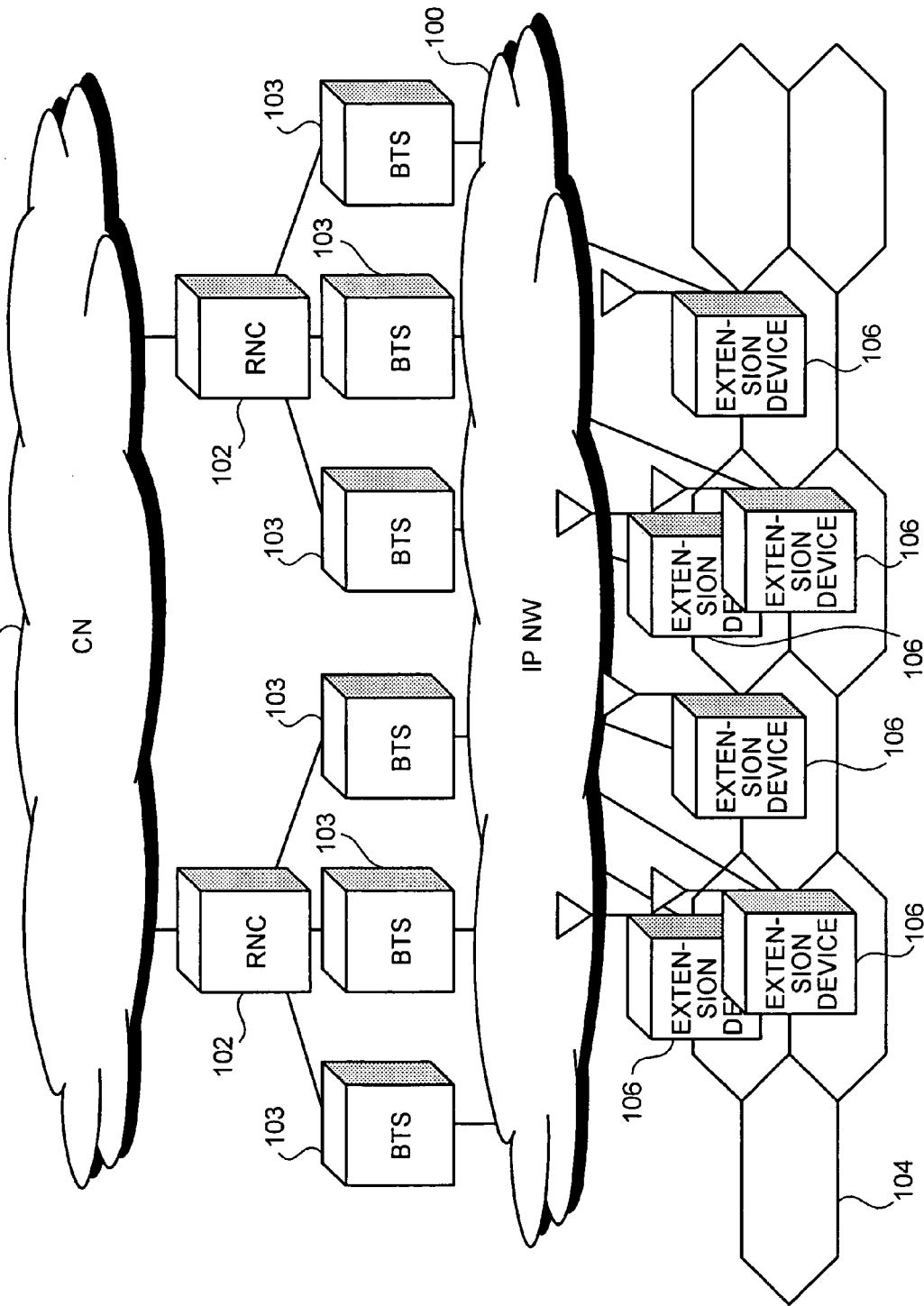
FIG. 1 is a schematic of a mobile radio communication system according to embodiments of the invention.

FIG. 1 is a schematic of a mobile radio communication system according to embodiments of the present invention. As shown in FIG. 1, radio network controllers (RNC) 102 are connected to a core network (CN) 101. Base transceiver stations (BTS) 103 are connected to each of the radio network controllers 102. Each of the base transceiver stations is connected to an internet protocol (IP) network (IPNW) 100. Extension devices 106 are connected to the IP network 100. Each of the extension devices 106 is disposed by each service area 104. The base transceiver stations 103 can also be disposed in the service area 104.

IP addresses for identifying individual base transceiver stations 103 and extension devices 106 are attached to the base transceiver stations 103 and extension devices 106. Communication between an arbitrary base transceiver station 103 and an arbitrary extension device 106 can be performed by specification of the IP address. In other words, connection relationship between the base transceiver station 103 and the extension device 106 can be flexibly changed. The attached IP address can be a global address that uniquely identifies each base transceiver station 103 and each extension device 106 on the IP network 100.

In addition, a private network can be configured. In the private network, all or some of the base transceiver stations 103 and all or some of the extension devices 106 form groups. The IP address can also be a private address used only within the private network. When the private address is used, a gateway device (router) is disposed on a border between the internet and the private network. The gateway device converts the private address and the global address.

When the private network is configured in the mobile radio system shown in FIG. 1, for example, the base transceiver stations 103 can be divided into a plurality of base station groups to be managed. In this case, resources are shared between the base transceiver stations belonging to the same base station group. The extension device 106 uses the resources of one or more base transceiver stations 103 belonging to the same base station group. Alternatively, the resources can be shared between the base transceiver stations 103 belonging to differing base station groups, rather than the resources being shared between the base transceiver stations 103 belonging to the same base station group. The extension device 106 can use the resources of two or more base transceiver stations 103 separately belonging to two or more differing base station groups.

Moreover, the extension devices 106 can be divided into a plurality of extension device groups to be managed, or the extension device group and the base station groups can be combined. In this case, the extension device group shares the resources of one base transceiver station 103 or the resources of the base station group.

Figure 2:
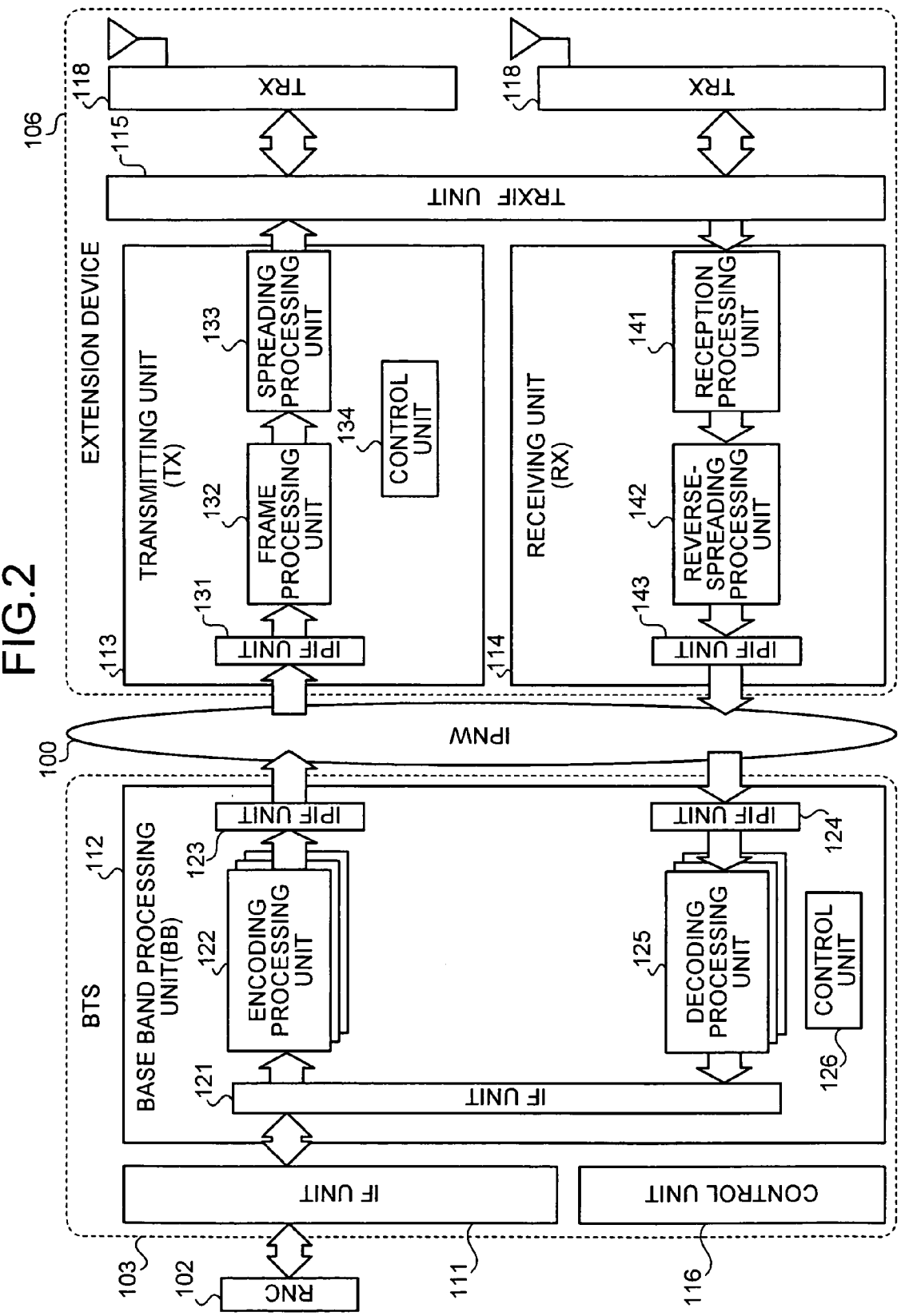
FIG. 2 is a schematic of a base transceiver station and an extension device in a mobile radio communication system according to a first embodiment of the present invention.

FIG. 2 is a schematic of a base transceiver station and an extension device in the mobile radio communication system according to a first embodiment of the present invention. As shown in FIG. 2, the base transceiver station 103 includes an interface (IF) unit 111, a base band processing unit (BB) 112, and a control unit 116. The interface unit 111 is for the radio network controller 102. The base band processing unit 112 performs an encoding process and a decoding process. The control unit 116 controls the overall base transceiver station 103. The base band processing unit 112 includes an interface (IF) unit 121, an encoding processing unit 122, an IP interface (IPIF) units 123 and 124, a decoding processing unit 125, and a control unit 126.

The interface unit 121 interfaces with the radio network controller 102 and connects with the interface unit 111. The encoding processing unit 122 performs an encoding process on the transmission data. One IP interface unit 123 is used to send the encoded transmission data to the IP network 100. The other IP interface unit 124 is used to receive reception data from the IP network 100. The decoding processing unit 125 performs a decoding process on the reception data. The control unit 126 controls the base band processing unit 112.

The extension device 106 includes a transmitting unit (TX) 113, a receiving unit (RX) 114, a transceiver (TRX) interface (TRXIF) unit 115, and a radio transceiving unit (TRX) 118. The TRX interface unit 115 interfaces between the transmitting unit 113 and the receiving unit 114, and the base transceiver unit 118. The transmitting unit 113 includes an IP interface (IPIF) unit 131, a frame processing unit 132, a spreading processing unit 133, and a control unit 134. The frame processing unit 132 and the spreading processing unit 133 can also perform one process as a modulation processing unit.

The IP interface unit 131 receives the transmission data from the IP network 100. The frame processing unit 132 performs a frame process on the transmission data. The spreading processing unit 133 performs a spreading process on the frame-processed transmission data. The spreading-processed transmission data is sent to the radio transceiving unit 118 from the TRX interface unit 115. The control unit 134 controls the spreading processing unit 133.

The receiving unit 114 includes a reception processing unit 141, a reverse-spreading processing unit 142, and an IP interface (IPIF) unit 143. The reception processing unit 141 and the reverse-spreading processing unit 142 can perform one process as a demodulation processing unit.

The reception processing unit 141 performs a reception process on the reception data received from the radio transceiving unit 118 via the TRX interface unit 115. The IP interface unit 143 sends the reverse-spreading-processed reception data to the IP network 100.

By the configuration above, the transmission data, which has not been spreading-processed, is sent to the extension device 106 from the base transceiver station 103, via the IP network 100. The reception data is reverse-spreading-processed by the extension device 106. The reception data, which has not been spreading-processed, is transmitted as is from the extension device 106 to the base transceiver station 103, via the IP network 100.

In other words, a transmission bandwidth required between the base transceiver station 103 and the extension device 106 is narrower than what is required conventionally. Therefore, a metal circuit, such as a pre-existing phone line, can be used as the transmission path between the base transceiver station 103 and the extension device 106, and the IP network 100. The transmission path can also be actualized using an optical cable.

Although a code-division multiple access (CDMA) technology is given as an example in the above-described configuration, the invention is not limited to the CDMA technology. The invention can also be applied to an orthogonal frequency division multiplexing (OFDM) technology. In this case the modulation processing unit and the demodulation processing unit perform processes of the respective technology.

Next, a procedure for performing a call from a mobile station (mobile terminal) will be explained. Explained first is when resources of a first base transceiver station (parent BTS1) 103a are assigned to shared channels 301 of a cell A 201 and individual control channels 302 of a mobile station (mobile terminal) (UE) 401 within the cell A 201, respectively, and the resources of a second base transceiver station (parent BTS2) 103b are assigned to individual traffic channels 303 of the same mobile station (mobile terminal) 401, in addition to shared channels 304 of another cell B 202, as shown in FIG. 3.

The shared channels 301 of the cell A 201 and the individual control channels 302 of the mobile station (mobile terminal) 401 reach the radio network controller 102, via a first extension device 106a, the IP network 100, and the first base transceiver station 103a. The individual traffic channels 303 of the mobile station (mobile terminal) 401 reaches the radio network controller 102, via the first extension device 106a, the IP network 100, and the second base transceiver station 103b. The shared channels 304 of the cell B 202 reaches the radio network controller 102, via a second extension device 106b, the IP network 100, and the second base transceiver station 103b.

Figure 3:
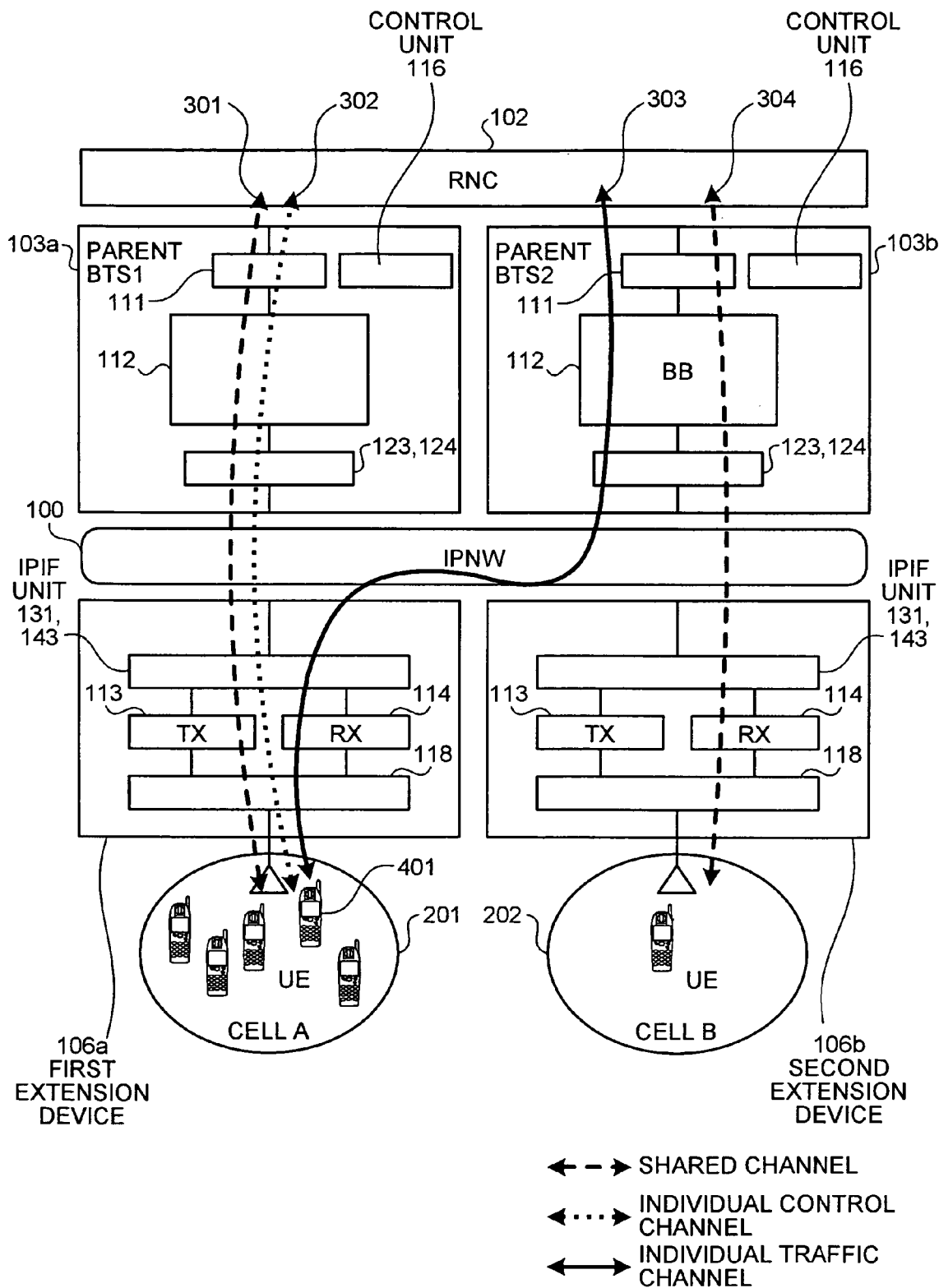
FIG. 3 is a schematic for illustrating resource assignment to channels according to the first embodiment.

FIG. 3 illustrates the IP interface units 123 and 124 of the base band processing unit 112. The IP interface units 131 and 143 are removed from the transmitting unit 113 and the receiving unit 114 of the extension device 106 and are collectively shown as one. The two radio transceiving units 118 are collectively shown as one. The TRX interface unit 115 of the extension device 106 is omitted. The above applies to FIG. 6, FIG. 10, and FIG. 12, as well.

Figure 4:
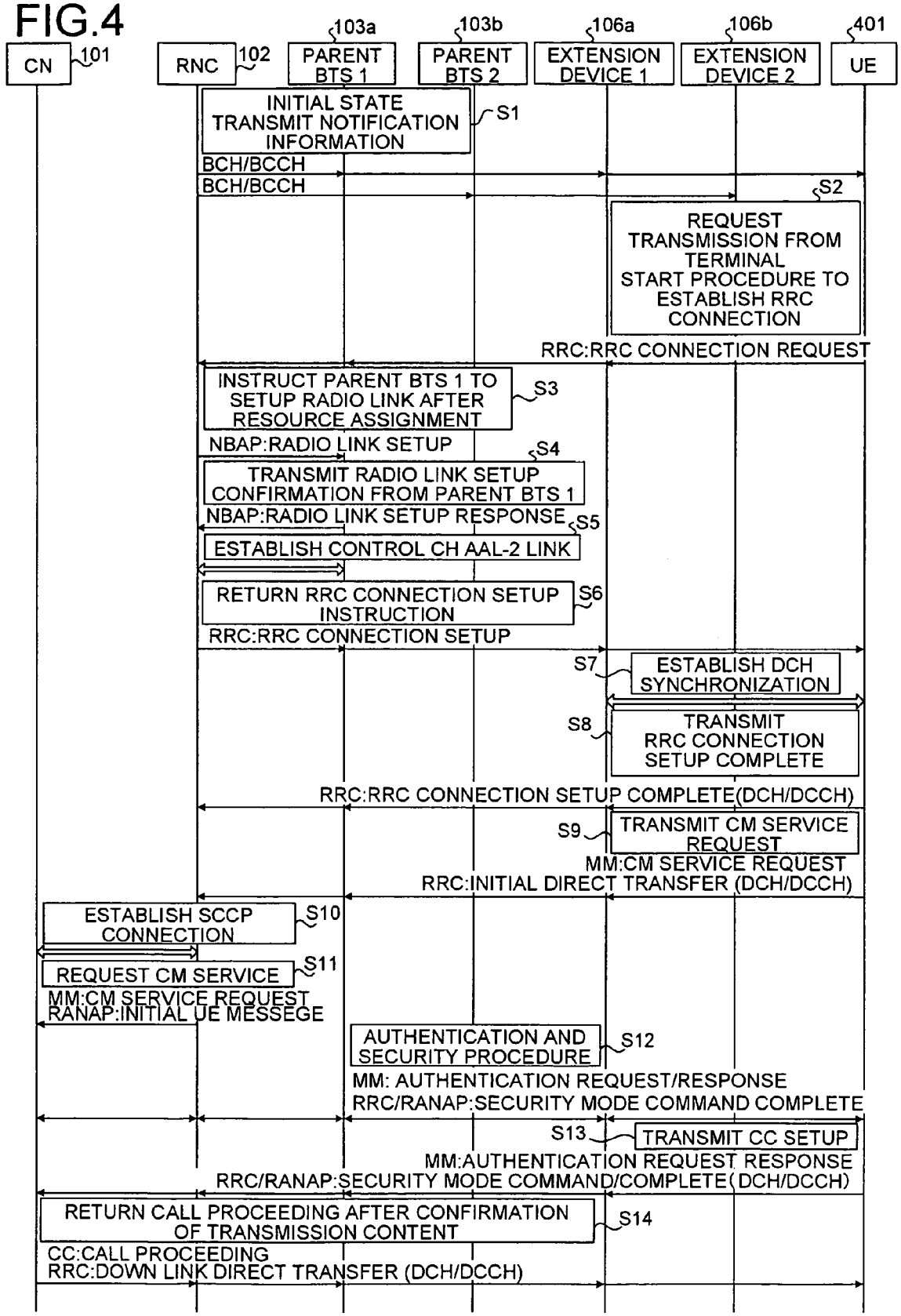
FIG. 4 is a schematic for illustrating a call procedure when a communication link is established by the resource assignment shown in FIG. 3.
Figure 5:
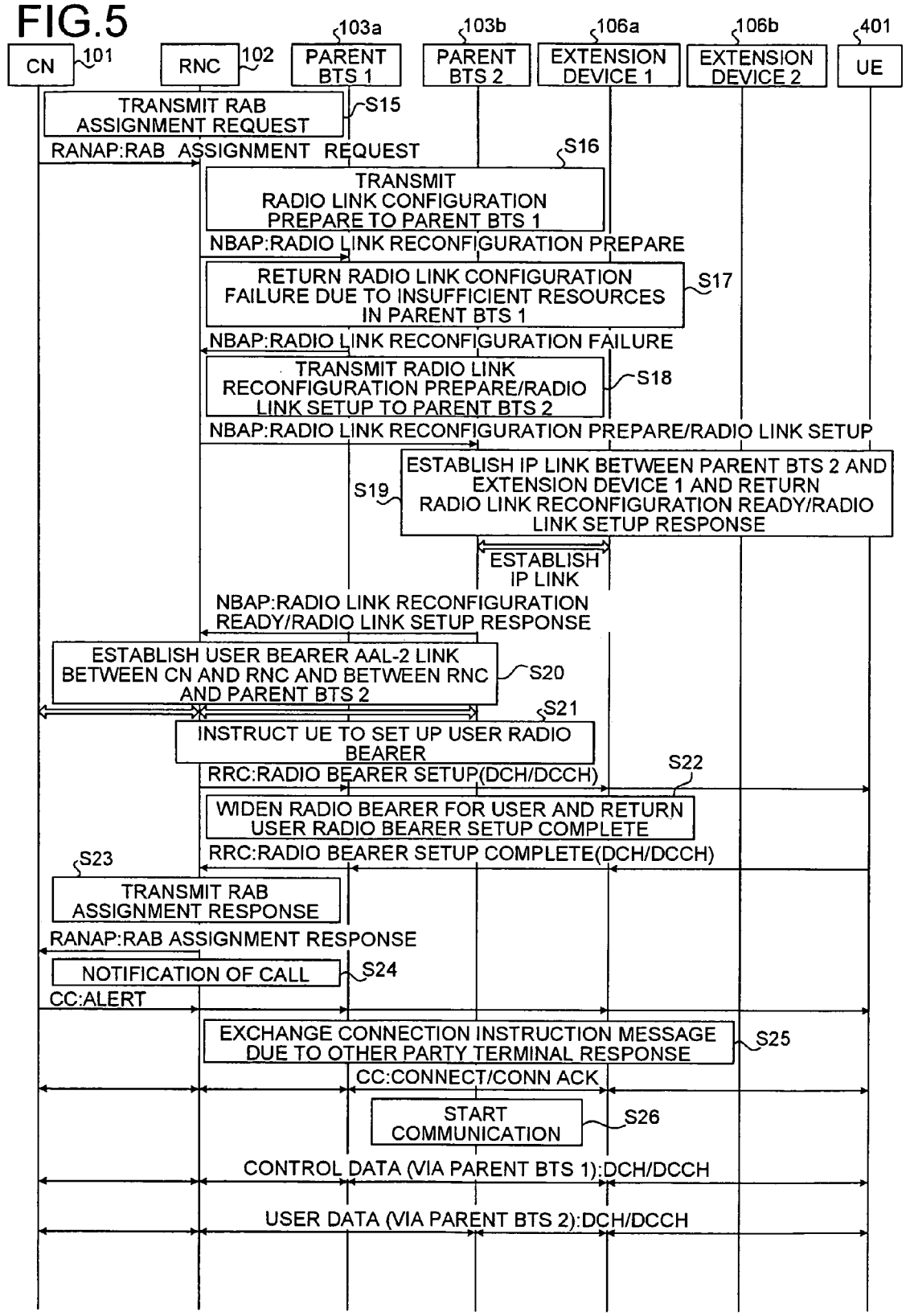
FIG. 5 is a schematic for illustrating the call procedure continued from the procedure shown in FIG. 4.

FIG. 4 and FIG. 5 are schematics for illustrating a procedure for a call from a terminal when a communication link is established between the mobile station (mobile terminal) and the radio network controller by the resource assignment shown in FIG. 3. FIG. 5 is a schematic for illustrating the call procedure continued from the procedure shown in FIG. 4. First, as shown in FIG. 4, the radio network controller 102 sends notification information to the first base transceiver station 103a and the second base transceiver station 103b in an initial state (step S1). The notification information sent to the first base transceiver station 103a is sent to the first extension device 106a and is further sent to the mobile station (mobile terminal) 401. The notification information sent to the second base transceiver station 103b is sent to the second extension device 106b.

Upon receiving the notification information, the mobile station (mobile terminal) 401 requests transmission from the terminal to the radio network controller 102, via the first extension device 106a and the first base transceiver station 103a. Then, the mobile station (mobile terminal) 401 starts a procedure for establishing a radio resource control (RRC) connection (step S2). Upon receiving the request for transmission from the terminal, the radio network controller 102 assigns the resources and instructs the first base transceiver station 103a to setup a radio link (step S3). Upon receiving the setup instruction, the first base transceiver station 103a returns a radio link setup confirmation to the radio network controller 102 (step S4). As a result, a control channel (ch) asynchronous transfer mode (ATM) adaptation layer (AAL)-2 link is established between the radio network controller 102 and the first base transceiver station 103a (step S5).

Next, the radio network controller 102 returns the RRC connection setup instruction to the mobile station (mobile terminal) 401, via the first base transceiver station 103a and the first extension device 106a (step S6). As a result, a dedicated channel (DCH) synchronization is established between the mobile station (mobile terminal) 401 and the first extension device 106a (step S7). Then, the mobile station (mobile terminal) 401 transmits RRC connection setup completion to the radio network controller 102, via the first extension device 106a and the first base transceiver station 103a (step S8). In addition, the mobile station (mobile terminal) 401 transmits a connection management (CM) service request to the radio network controller 102 via the first extension device 106a and the first base transceiver station 103a (step S9).

Next, a signaling connection control part (SCCP) connection is established between the radio network controller 102 and the core network 101 (step S10). The radio network controller 102 sends the CM service request to the core network 101 (step S11). Then, authentication and security procedures are performed between the core network 101 and the radio network controller 102, between the radio network controller 102 and the first base transceiver station 103a, between the first base transceiver station 103a and the first extension device 106a, and between the first extension device 106a and the mobile station (mobile terminal) 401, respectively (step S12).

Next, the mobile station (mobile terminal) 401 transmits a call control (CC) setup to the core network 101, via the first extension device 106a, the first base transceiver station 103a, and the radio network controller 102 (step S13). In response, after confirming the transmission content, the core network 101 returns a call proceeding to the mobile station (mobile terminal) 104, via the radio network controller 102, the first base transceiver station 103a, and the first extension device 106a (step S14).

Then, as shown in FIG. 5, the core network 101 transmits a radio access bearer (RAB) assignment request to the radio network controller 102 (step S15). Upon receiving the RAB assignment request, the radio network controller 102 transmits a radio link configuration prepare to the first base transceiver station 103a (step S16). The resources in the first base transceiver station 103a are insufficient, and therefore, the first base transceiver station 103a returns a radio configuration failure to the radio network controller 102 (step S17).

Upon receiving the radio link configuration failure, the radio network controller 102 transmits the radio link configuration prepare and the radio link setup to the second base transceiver station 103 (step S18). As a result, an IP link is established between the second base transceiver station 103b and the first extension device 106a. Then, the second base transceiver station 103b returns a radio link reconfiguration ready and a radio link setup response to the radio network controller 102 (step S19).

As a result, a user bearer AAL-2 link is established between the core network 101 and the radio network controller 102 and between the radio network controller 102 and the second base transceiver station 103b, respectively (step S20). Then, the radio network controller 102 instructs the mobile station (mobile terminal) 401 to set up a user radio bearer, via the first base transceiver station 103a and the first extension device 106a (step S21). Upon receiving the instruction, the mobile station (mobile terminal) 401 widens the radio bearer so as to be used a user radio bearer and returns a user radio bearer setup complete to the radio network controller 102, via the first extension device 106a and the first base transceiver station 103a (step S22).

Next, the radio network controller 102 transmits a RAB assignment response to the core network 101 (step S23). In response, the core network 101 notifies the mobile station (mobile terminal) 401 of a call, via the radio network controller 102, the first base transceiver station 103a, and the first extension device 106a (step S24). Then, a connection instruction message due to response from other party terminal is exchanged between the mobile station (mobile terminal) 401 and the first extension device 106*a*, between the first extension device 106*a* and the first base transceiver station 103*a*, between the first base transceiver station 103*a* and the radio network controller 102, and between the radio network controller 102 and the core network 101, respectively (step S25).

Then, communication is started (step S26). When starting communication, control data is transmitted through the radio network controller 102, the first base transceiver station 103*a*, and the first extension device 106*a*, between the core network 101 and the mobile station (radio mobile station) 401. User data is transmitted through the radio network controller 102, the second base transceiver station 103*b*, and the first extension device 106*a*. The radio network controller 102 acknowledges information of the cell A 201 and control information of the mobile station (mobile terminal) 401 that are transmitted from the first base transceiver station 103*a*, and user data of the mobile station (mobile terminal) 402 transmitted from the second base transceiver station 103*b* as information related to the same mobile station (mobile terminal) 401.

Figure 6:
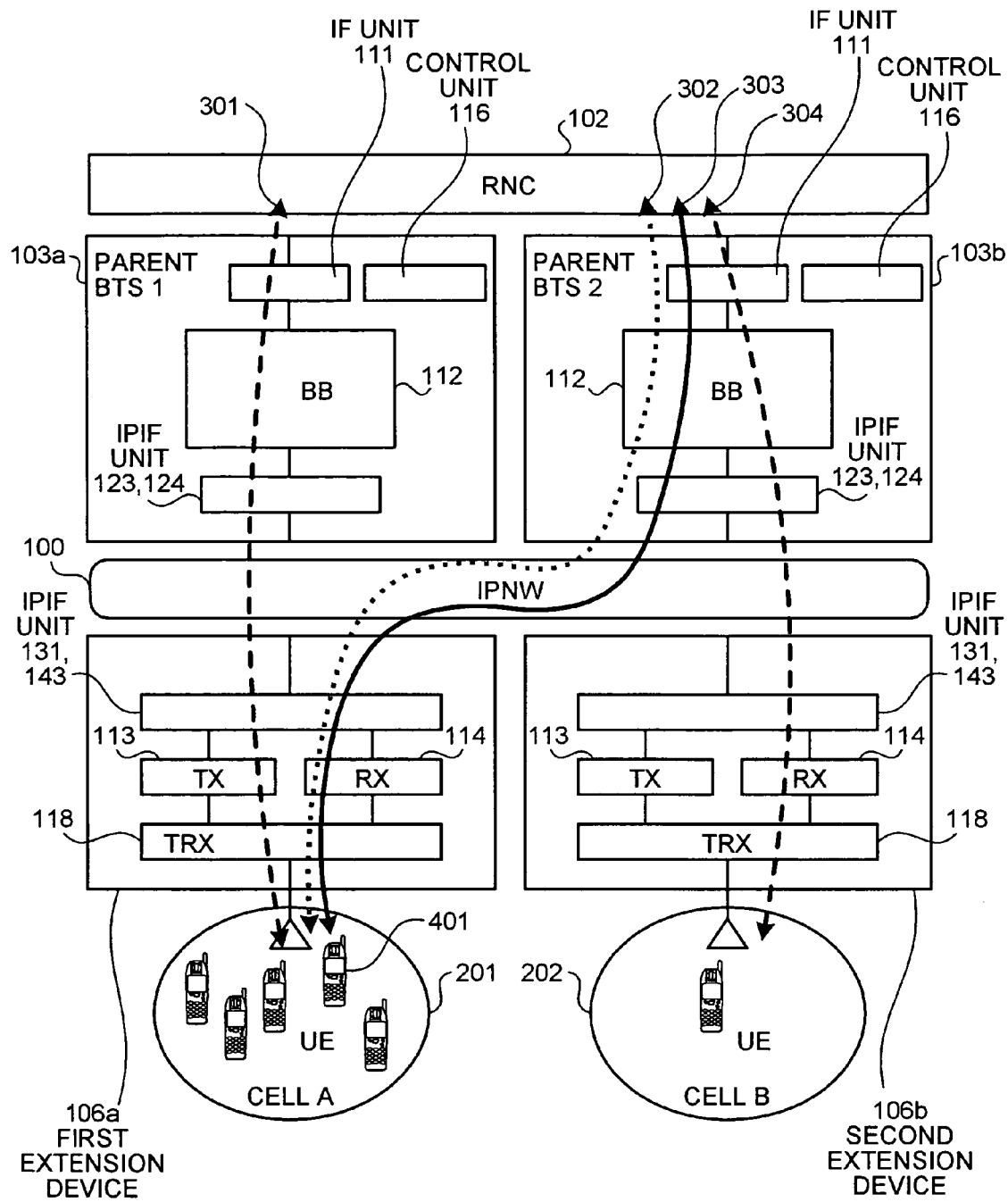
FIG. 6 is a schematic of another resource assignment to the channels according to the first embodiment.

Explained next is when the resources of the first base transceiver station 103*a* are assigned to the shared channels 301 of the cell A 201, and the resources of the second base transceiver station 103*b* are assigned to the individual control channels 302 and the individual traffic channels 303 of the mobile station (mobile terminal) 401 within the cell A 201, in addition to the shared channels 304 of another cell B 202, as shown in FIG. 6. The state in FIG. 6 differs from that in FIG. 3 in that the individual control channels 302 of the mobile station (mobile terminal) 401 reaches the radio network controller 102, via the first extension device 106*a*, the IP network 100, and the second base transceiver station 103*b*.

Figure 7:
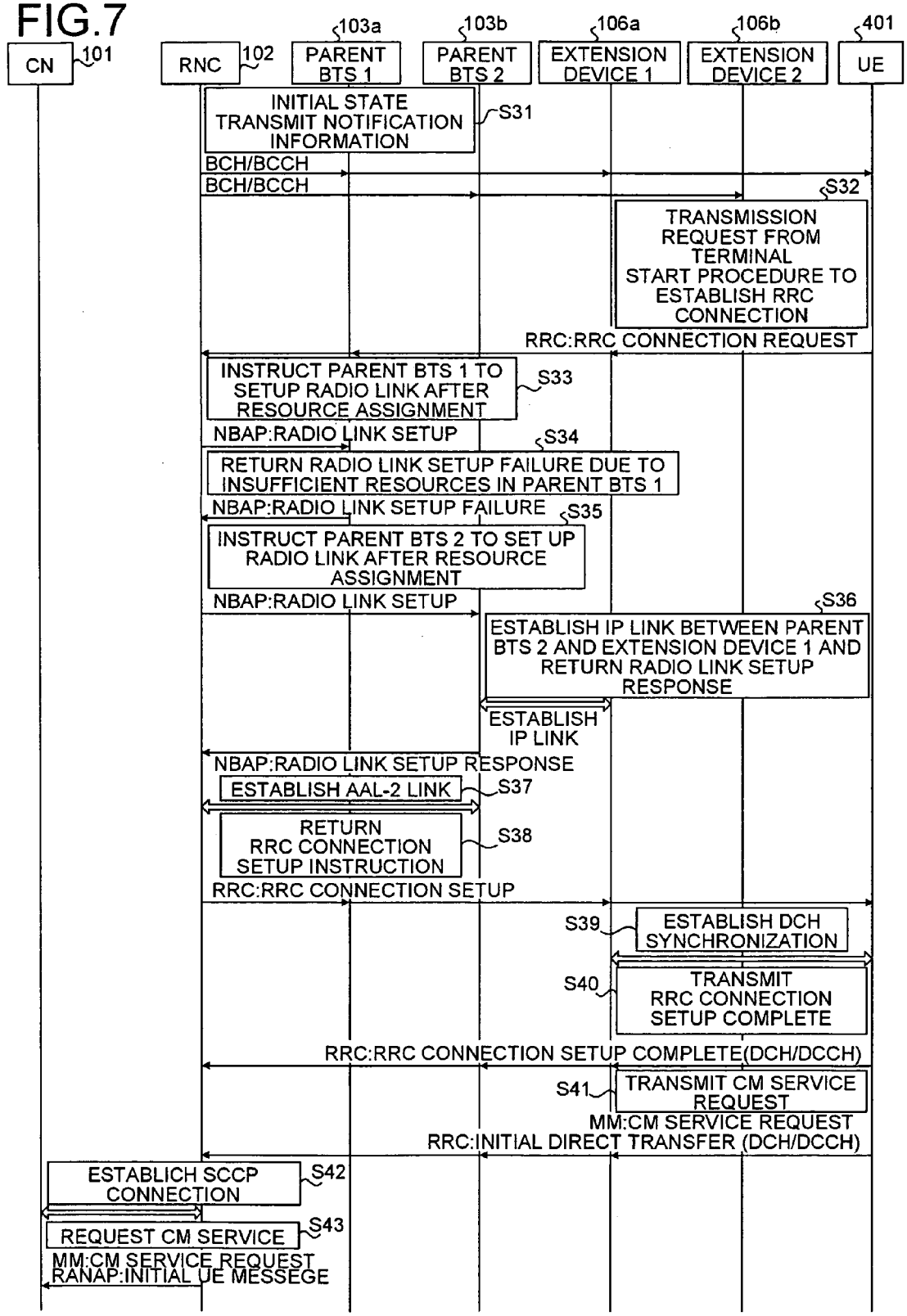
FIG. 7 is a schematic for illustrating a call procedure when the communication link is established by the resource assignment shown in FIG. 6.
Figure 8:
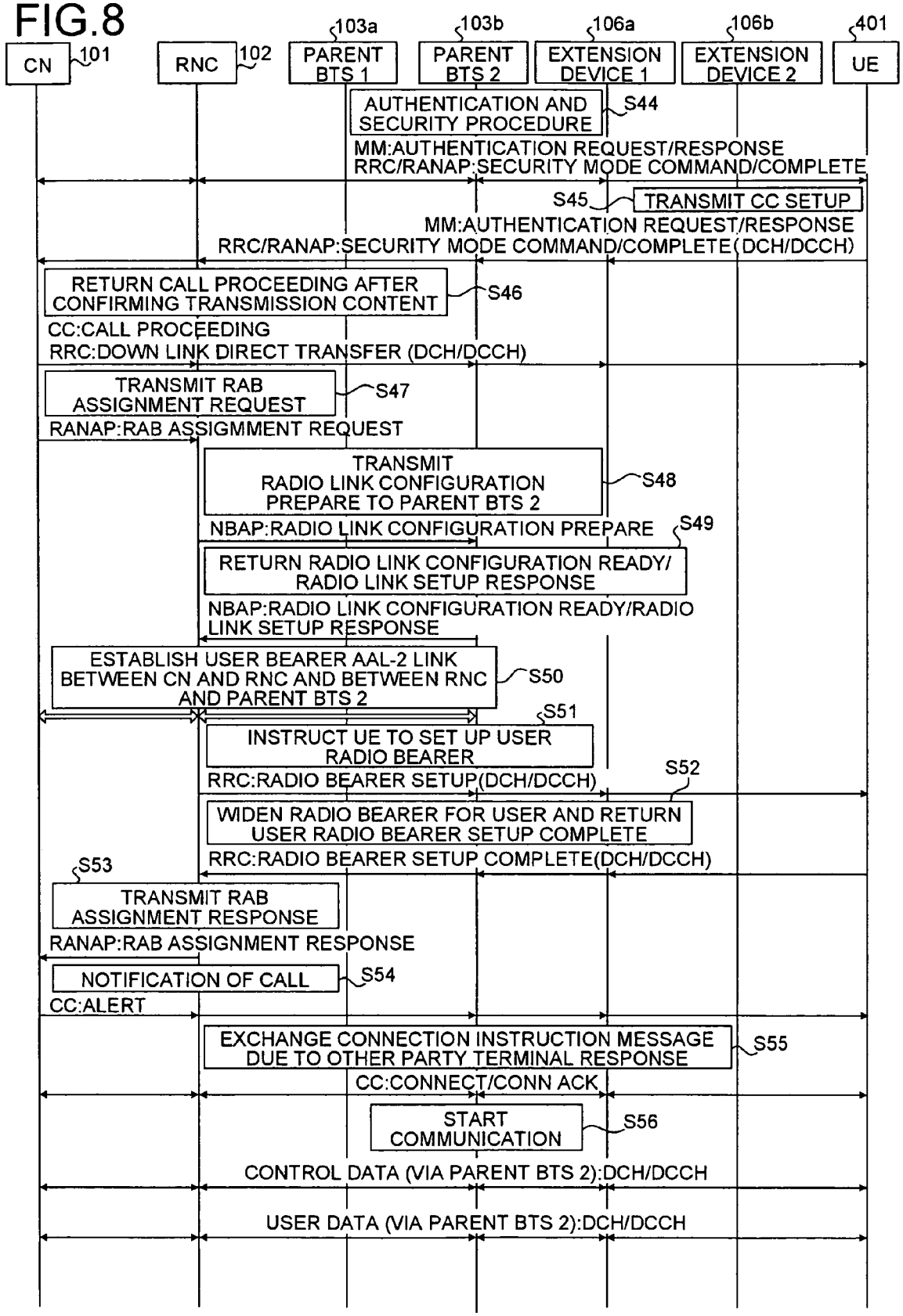
FIG. 8 is a schematic for illustrating the call procedure continued from the procedure shown in FIG. 7.

FIG. 7 and FIG. 8 are schematics for illustrating a call procedure for a call from a terminal when a communication link is established between the mobile station (mobile terminal) and the radio network controller by the resource assignments shown in FIG. 6. FIG. 8 is a schematic for illustrating the call procedure continued from the procedure shown in FIG. 7. First, as shown in FIG. 7, the radio network controller 102 transmits notification information to the mobile station (mobile terminal) 401, via the first base transceiver station 103*a* and the first extension device 106*a*, in the initial state. The radio network controller 102 also transmits the notification information to the second extension device 106*b*, via the second base transceiver station 103*b* (step S31).

Upon receiving the notification information, the mobile station (mobile terminal) 401 requests transmission from the terminal to the radio network controller 102, via the first extension device 106*a* and the first base transceiver station 103*a*. Then, the mobile station (mobile terminal) 401 starts the procedure for establishing the RRC connection (step S32). Upon receiving the request for transmission from the terminal, the radio network controller 102 assigns the resources and instructs the first base transceiver station 103*a* to setup a radio link (step S33). The resources in the first base transceiver station 103*a* are insufficient, and therefore, the first base transceiver station 103*a* returns a radio link setup failure to the radio network controller 102 (step S34).

Upon receiving the radio link setup failure, the radio network controller 102 assigns the resources and instructs the second base transceiver station 103*b* to set up the radio link (step S35). As a result, the IP link is established between the second base transceiver station 103*b* and the first extension device 106*a*. Then, the second base transceiver station 103*b* returns the radio link setup response to the radio network controller 102 (step S36).

Next, when the AAL-2 link is established between the radio network controller 102 and the second base transceiver station 103*b* (step S37), the radio network controller 102 returns the RRC connection setup instruction to the mobile station (mobile terminal) 401, via the first base transceiver station 103*a* and the first extension device 106*a* (step S38). As a result, the DCH synchronization is established between the mobile station (mobile terminal) 401 and the first extension device 106*a* (step S39). Then, the mobile station (mobile terminal) 401 transmits the RRC connection setup completion to the radio network controller 102, via the first extension device 106*a* and the second base transceiver station 103*b* (step S40). In addition, the mobile station (mobile terminal) 401 transmits the CM service request to the radio network controller 102, via the first extension device 106*a* and the second base transceiver station 103*b* (step S41).

Then, when the SCCP connection is established between the radio network controller 102 and the core network 101 (step S42), the radio network controller 102 sends the CM service request to the core network 101 (step S43). Then, the authentication and security procedures are performed between the core network 101 and the radio network controller 102, between the radio network controller 102 and the second base transceiver station 103*b*, between the second base transceiver station 103*b* and the first extension device 106*a*, and between the first extension device 106*a* and the mobile station (mobile terminal) 401, respectively, as shown in FIG. 8 (step S44).

Next, the mobile station (mobile terminal) 401 transmits a CC setup to the core network 101, via the first extension device 106*a*, the second base transceiver station 103*b*, and the radio network controller 102 (step S45). In response, after confirming the transmission contents, the core network 101 returns the call proceeding to the mobile station (mobile terminal) 401, via the radio network controller 102, the second base transceiver station 103*b*, and the first extension device 106*a* (step S46).

Next, the core network 101 transmits the RAB assignment request to the radio network controller 102 (step S47). Upon receiving the RAB assignment request, the radio network controller 102 transmits the radio link configuration prepare to the second base transceiver station 103*b* (step S48). The second base transceiver station 103*b* returns the radio link configuration ready and the radio link setup response to the radio network controller 102 (step S49).

As a result, the user bearer AAL-2 link is established between the core network 101 and the radio network controller 102 and between the radio network controller 102 and the second base transceiver station 103*b*, respectively (step S50). Next, the radio network controller 102 instructs the mobile station (mobile terminal) 401 to set up the user radio bearer, via the second base transceiver station 103*b* and the first extension device 106*a* (step S51). Upon receiving the instruction, the mobile station (mobile terminal) 401 widens the radio bearer so as to be used the user radio bearer and returns the user radio bearer setup complete to the radio network controller 102, via the first extension device 106*a* and the second base transceiver station 103*b* (step S52).

Next, the radio network controller 102 transmits the RAB assignment response to the core network 101 (step S53). In response, the core network 101 notifies the mobile station (mobile terminal) 401 of a call, via the radio network controller 102, the second base transceiver station 103*b*, and the first extension device 106*a* (step S54). Then, the connection instruction message due to response from other party terminal is exchanged between the mobile station (mobile terminal) 401 and the first extension device 106*a*, between the first extension device 106a and the second base transceiver station 103b, between the second base transceiver station 103b and the radio network controller 102, and between the radio network controller 102 and the core network 101, respectively (step S55).

Next, communication starts (step S56). When starting communication, the control data and the user data are transmitted through the radio network controller 102, the second base transceiver station 103b, and the first extension device 106a, between the core network 101 and the mobile station (radio mobile station) 401. The radio network controller 102 acknowledges the cell A 201 information transmitted from the first base transceiver station 103a and the mobile station (mobile terminal) 402 control information and user data transmitted from the second base transceiver station 103b as information related to the same mobile station (mobile terminal) 401. The call procedure when the shared channels, the individual control channels, and the individual traffic channels use the resources of the same base transceiver station is the same as the conventional procedure, and therefore, explanations are omitted.

Figure 9:
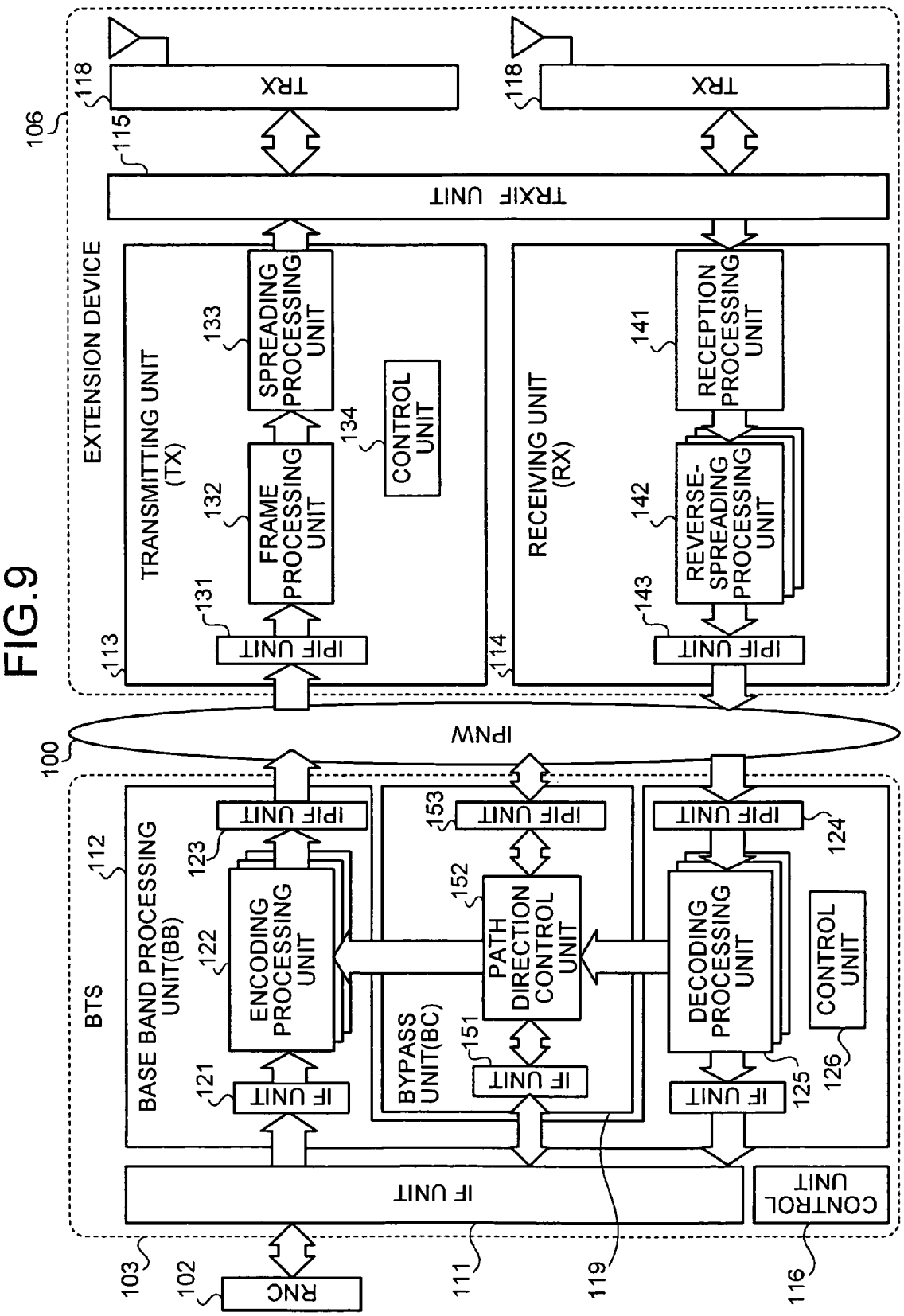
FIG. 9 is a schematic of a base transceiver station and an extension device in a mobile radio communication system according to a second embodiment of the present invention.

FIG. 9 is a schematic of the base transceiver station and the extension device in the mobile radio communication system according to a second embodiment of the present invention. As shown in FIG. 9, in the second embodiment, the base transceiver station 103 further includes a bypass unit 119 used to communicate with other base transceiver stations. The bypass unit 119 includes an interface (IF) unit 151, a path direction control unit 152, and an IP interface (IPIF) unit 153.

The interface unit 151 interfaces with the radio network controller 102 and connects with the interface unit 111. The path direction control unit 152 controls the direction of data flow between the IP network 100, the radio network controller 102, and the encoding processing unit 122 and the decoding processing unit 125 in the base band processing unit 112. The IP interface unit 153 is used to exchange data between the path direction control unit 152 and the IP network 100.

In the first embodiment, when the resources of the base transceiver stations are assigned to the shared channels and the individual channels between the core network 101 and a terminal, the radio network controller controlled the resource assignment. On the other hand, in the second embodiment, the base transceiver station on the shared channel processing-end requests another base transceiver station to secure the resources, via its own bypass unit 119 and that of the other base transceiver station, and the IP network 100. Subsequently, data and instructions to the individual channels from the radio network controller are received and passed between both base transceiver stations, via the bypass units 119 and the IP network 100.

Next, a procedure for a call from the mobile station (mobile terminal) will be explained. Explained first is when the resources of the first base transceiver station 103a are assigned to the shared channels 301 of the cell A 201 and the individual control channels 302 of the mobile station (mobile terminal) 401 within the cell A 201, respectively, and the resources of the second base transceiver station 103b are assigned to the individual traffic channels 303 of the same mobile station (mobile terminal) 401, in addition to the shared channels 304 of another cell B 202.

In this case, the individual traffic channels 303 of the mobile station (mobile terminal) 401 passes through the first extension device 106a, the IP network 100, and the babe band processing unit 112 and the bypass unit 119 of the second base transceiver station 103b. Then the individual traffic channels 303 passes through the IP network 100 again, passes through the bypass unit 119 of the first base transceiver station 103a, and reaches the radio network controller 102. The shared channels 301 of the cell A 201, the individual control channels 302 of the mobile station (mobile terminal) 401, and the shared channels 304 of the cell B 202 are the same as those in FIG. 3.

Figure 10:
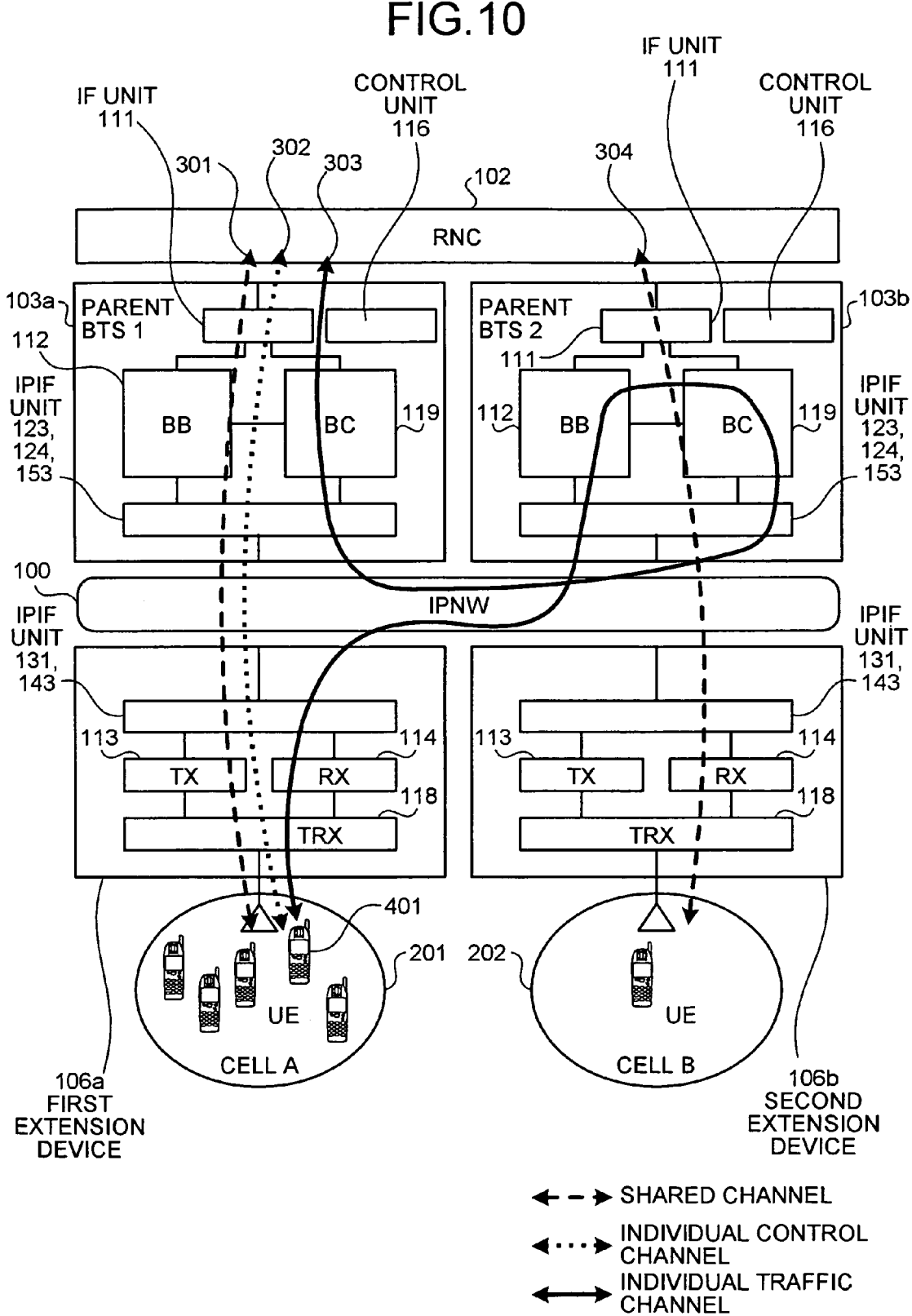
FIG. 10 is a schematic of resource assignment to channels according to the second embodiment.

In the example shown in FIG. 10, the IP interface unit 153 of the bypass unit 119 is removed from the bypass unit 119 and is shown as one, collectively with the IP interface units 123 and 124 removed from the base band processing unit 112. This also applies to the example shown in FIG. 12.

Figure 11:
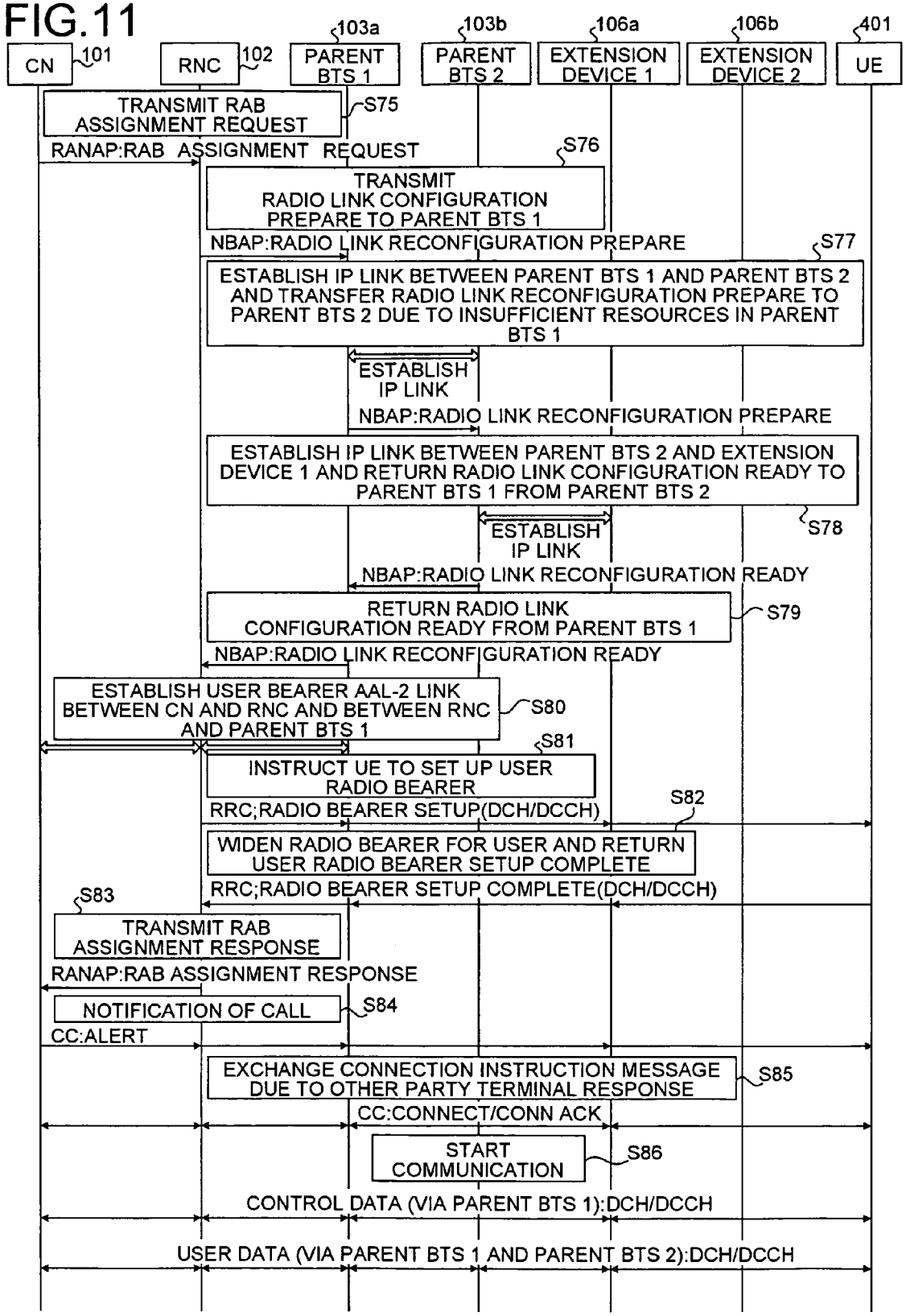
FIG. 11 is a schematic for illustrating a call procedure when a communication link is established by the resource assignment shown in FIG. 10.

FIG. 11 is a schematic for illustrating a call procedure for a call from a terminal when the communication link is established between the mobile station (mobile terminal) and the radio network controller by the resource assignment shown in FIG. 10. First, step S1 to step S14 shown in FIG. 4 are performed. Then, as shown in FIG. 11, the core network 101 transmits the RAB assignment request to the radio network controller 102 (step S75). Upon receiving the RAB assignment request, the radio network controller 102 transmits the radio link configuration prepare to the first base transceiver station 103a (step S76). The resources in the first base transceiver station 103a are insufficient, and therefore, the first base transceiver station 103a establishes the IP link with the second base transceiver station 103b and transfers the radio link reconfiguration prepare to the second base transceiver station 103b (step S77).

As a result, the IP link is established between the first base transceiver station 103a and the second base transceiver station 103b. Then, the second base transceiver station 103b returns the radio link configuration ready to the first base transceiver station 103a (step S78). Furthermore, the first base transceiver station 103a returns the radio link configuration ready to the radio network controller 102 (step S79). As a result, the user bearer AAL-2 link is established between the core network 101 and the radio network controller 102 and between the radio network controller 102 and the first base transceiver station 103a, respectively (step S80).

Next, the radio network controller 102 instructs the mobile station (mobile terminal) 401 to establish the user radio bearer, via the first base transceiver station 103a and the first extension device 106a (step S81). Upon receiving the instruction, the mobile station (mobile terminal) 401 widens the radio bearer so as to be used the user radio bearer and returns the user radio bearer setup complete to the radio network controller 102, via the first extension device 106a and the first base transceiver station 103a (step S82).

Next, the radio network controller 102 transmits the RAB assignment response to the core network 101 (step S83). In response, the core network 101 notifies the mobile station (mobile terminal) 401 of a call, via the radio network controller 102, the first base transceiver station 103a, and the first extension device 106a (step S84). Then, the connection instruction message due to response from other party terminal is exchanged between the mobile station (mobile terminal) 401 and the first extension device 106a, between the first extension device 106a and the first base transceiver station 103a, between the first base transceiver station 103a and the radio network controller 102, and between the radio network controller 102 and the core network 101, respectively (step S85).

Next, communication starts (step S86). When starting communication, the control data is transmitted through the radio network controller 102, the first base transceiver station 103a, and the first extension device 106a, between the core network 101 and the mobile station (radio mobile station) 401. The user data is transmitted through the radio network controller 102, the first base transceiver station 103a, the second base transceiver station 103b, and the first extension device 106a. The cell A 201 information, and the control data and the user data of the mobile station (mobile terminal) 401 are transmitted from the first base transceiver station 103a to the radio network controller 102, as are transmitted conventionally. Therefore, the radio network controller 102 acknowledges these information and data as information related to the mobile station (mobile terminal) 401, as are acknowledged conventionally.

Figure 12:
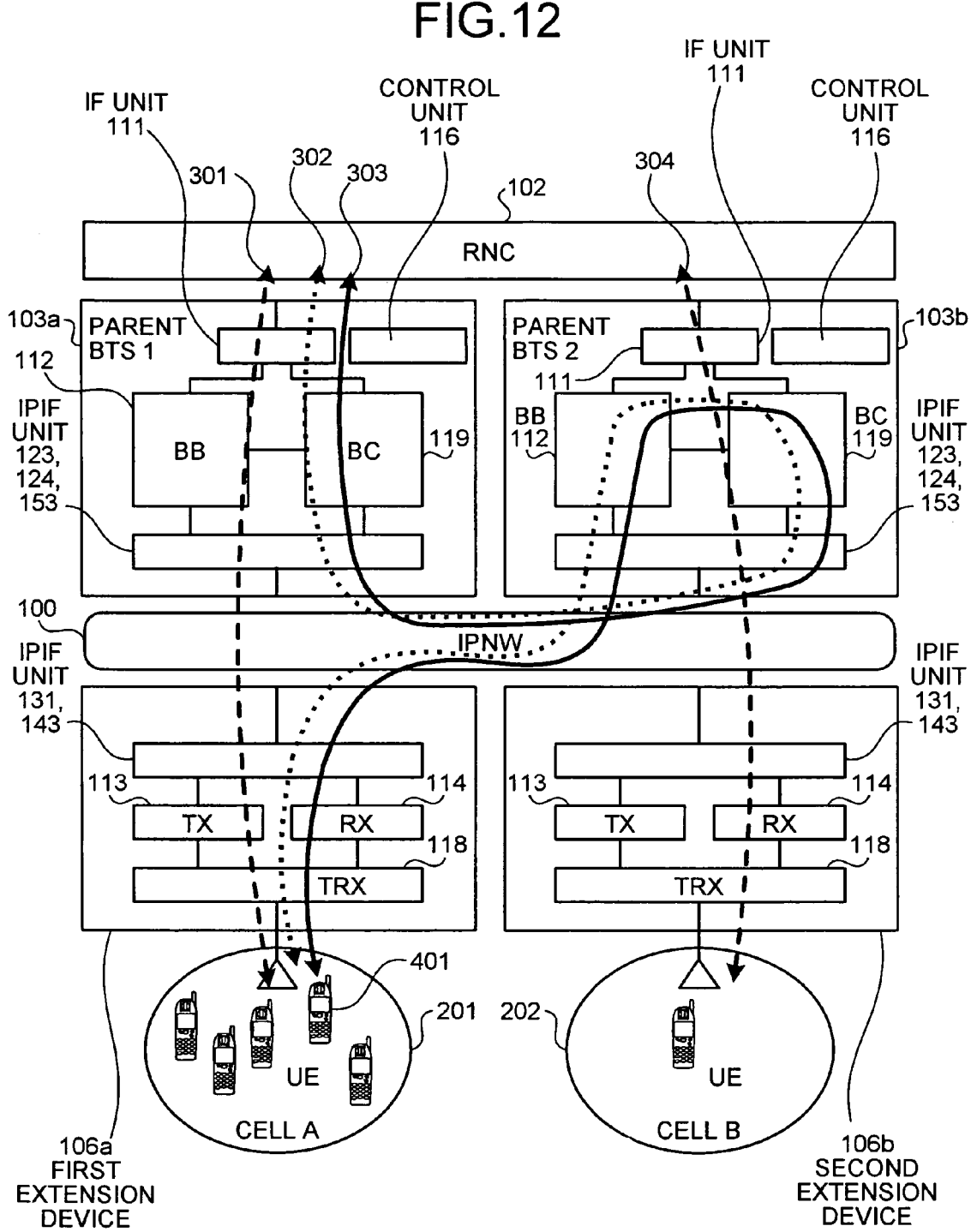
FIG. 12 is a schematic of another resource assignment to the channels according to the second embodiment.

Explained next is when the resources of the first base transceiver station 103a are assigned to the shared channels 301 of the cell A 201, and the resources of the second base transceiver station 103b are assigned to the individual control channels 302 and the individual traffic channels 303 of the mobile station (mobile terminal) 401 within the cell A 201, in addition to the shared channels 304 of another cell B 202, as shown in FIG. 12. The state in FIG. 12 differs from that in FIG. 10 in that the individual control channels 302 of the mobile station (mobile terminal) 401 reaches the radio network controller 102, via the first extension device 106a, the IP network 100, the second base transceiver station 103b, and the first base transceiver station 103a.

Figure 13:
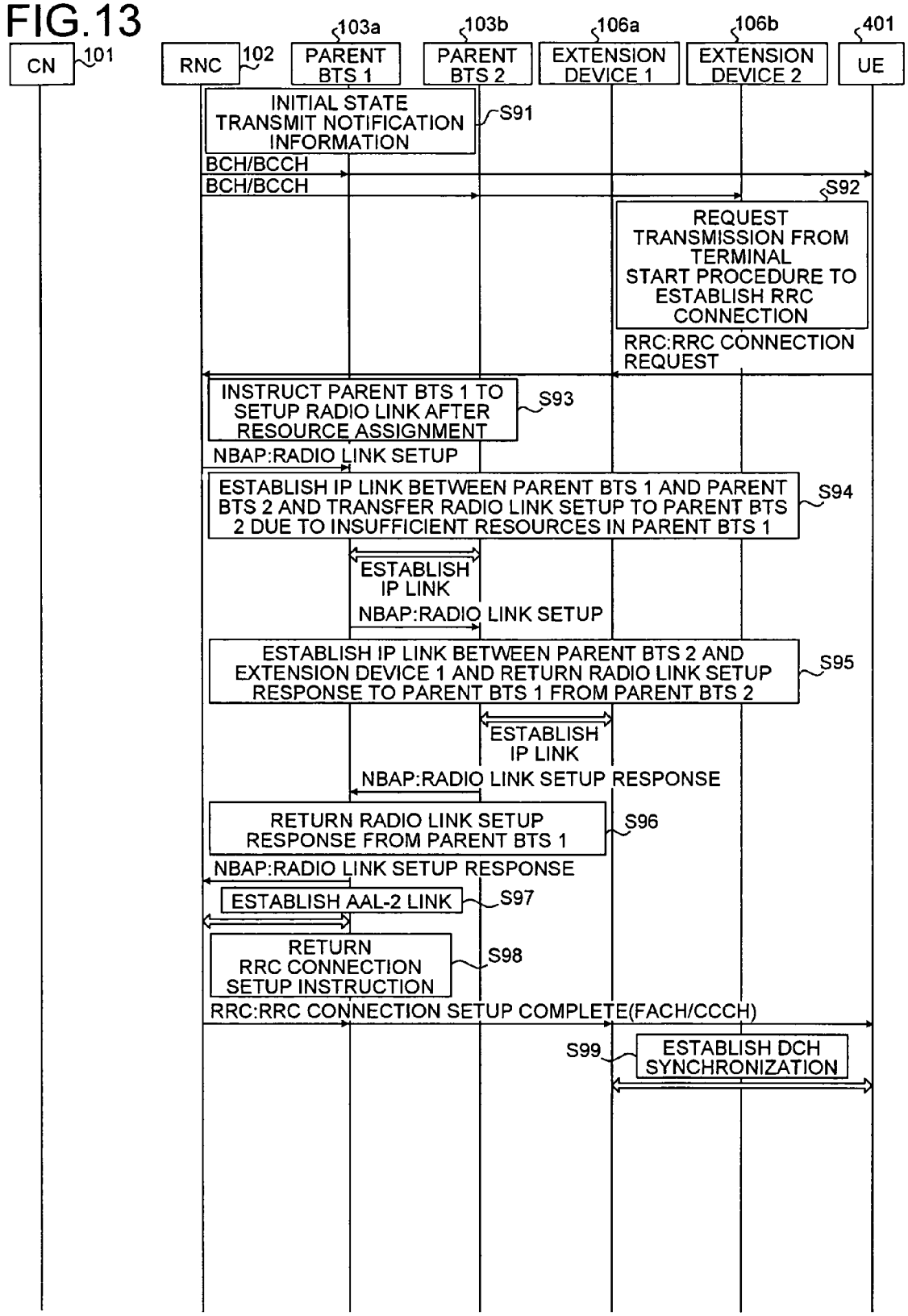
FIG. 13 is a schematic for illustrating a call procedure when a communication link is established by the resource assignment shown in FIG. 12.
Figure 14:
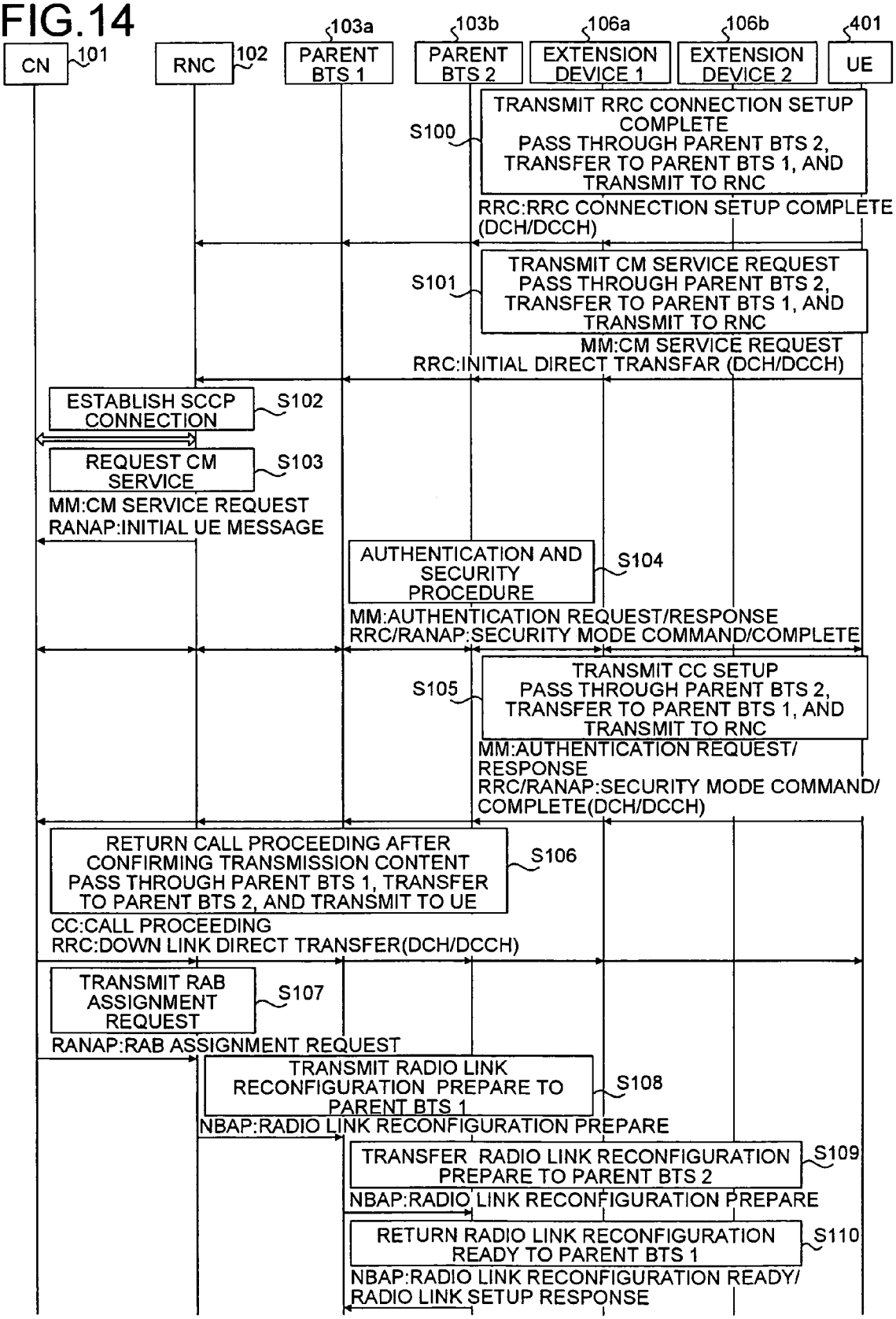
FIG. 14 is a schematic for illustrating the call procedure continued from the procedure shown in FIG. 13.
Figure 15:
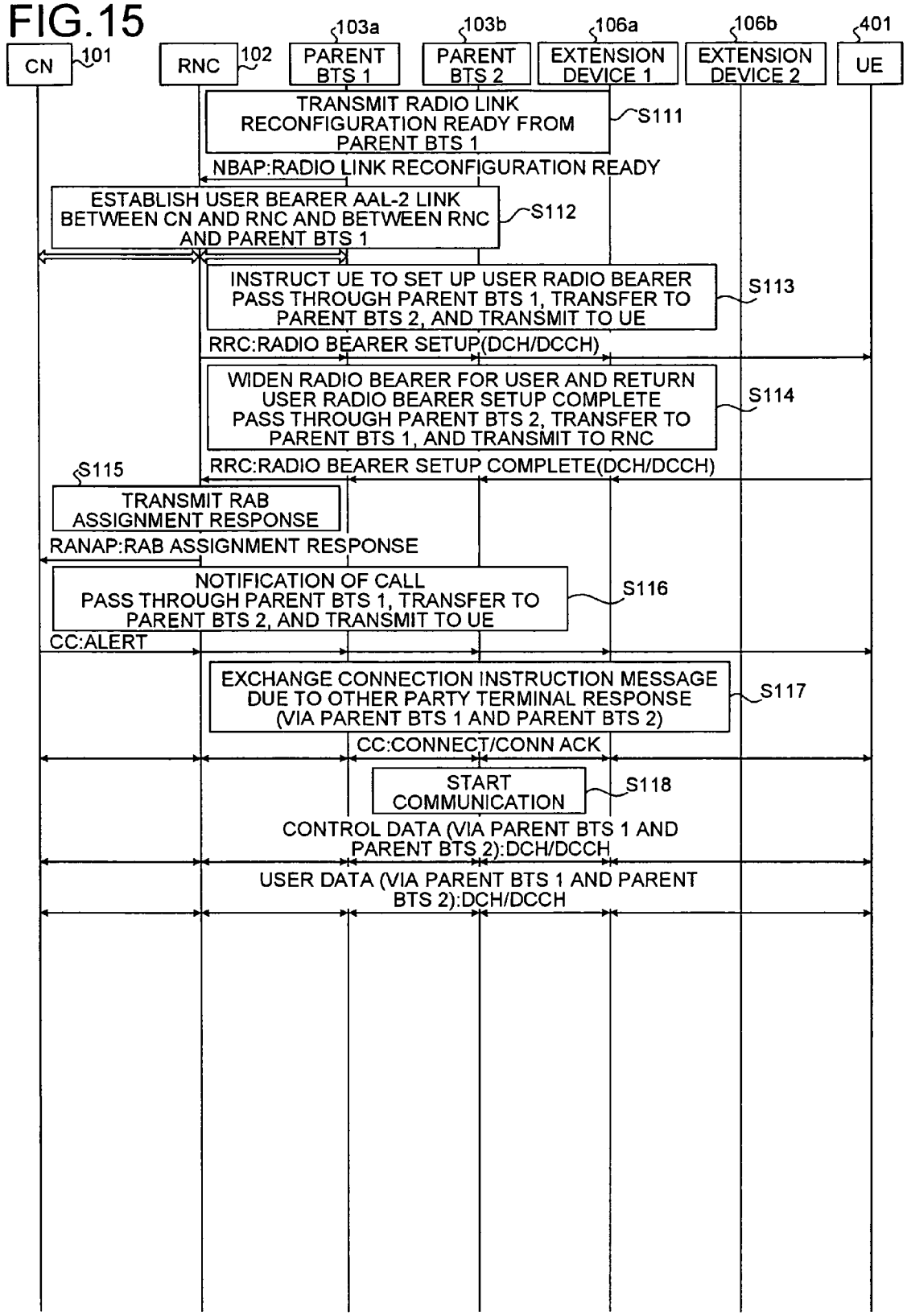
FIG. 15 is a schematic for illustrating the call procedure continued from the procedure shown in FIG. 14.

FIG. 13 to FIG. 15 are schematics for illustrating a call procedure for a call from a terminal when a communication link is established between the mobile station (mobile terminal) and the radio network controller by the resource assignments shown in FIG. 12. FIG. 14 illustrates the procedure continued from the procedure shown in FIG. 13, and FIG. 15 illustrates the procedure continued from the procedure shown in FIG. 14. First, as shown in FIG. 13, the radio network controller 102 transmits notification information to the mobile station (mobile terminal) 401, via the first base transceiver station 103a and the first extension device 106a, in the initial state. The radio network controller 102 also transmits the notification information to the second extension device 106b, via the second base transceiver station 103b (step S91).

Upon receiving the notification information, the mobile station (mobile terminal) 401 requests transmission from the terminal to the radio network controller 102, via the first extension device 106a and the first base transceiver station 103a. Then, the mobile station (mobile terminal) 401 starts the procedure for establishing the RRC connection (step S92). Upon receiving the request for transmission from the terminal, the radio network controller 102 assigns the resources and instructs the first base transceiver station 103a to setup the radio link (step S93).

The resources in the first base transceiver station 103a are insufficient, and therefore, the first base transceiver station 103a establishes the IP link with the second base transceiver station 103b and transfers the radio link setup to the second base transceiver station 103b (step S94). The second base transceiver station 103b establishes the IP link with the first extension device 106a and returns the radio link setup response to the first base transceiver station 103a (step S95). Furthermore, the first base transceiver station 103a returns the radio link setup response to the radio network controller 102 (step S96).

Next, when the AAL-2 link is established between the radio network controller 102 and the first base transceiver station 103a (step S97), the radio network controller 102 returns the RRC connection setup instruction to the mobile station (mobile terminal) 401, via the first base transceiver station 103a and the first extension device 106a (step S98). As a result, the DCH synchronization is established between the mobile station (mobile terminal) 401 and the first extension device 106a (step S99).

Next, as shown in FIG. 14, the mobile station (mobile terminal) 401 transmits the RRC connection setup complete (step S100). The RRC connection setup complete message is transferred to the first base transceiver station 103a, via the first extension device 106a and the second base transceiver station 103b, and is returned to the radio network controller 102 from the first base transceiver station 103a. In addition, the mobile station (mobile terminal) 401 transmits the CM service request (step S101). The CM service request is transferred to the first base transceiver station 103a, via the first extension device 106a and the second base transceiver station 103b, and is transmitted to the radio network controller 102 from the first base transceiver station 103a.

Next, when the SCCP connection is established between the radio network controller 102 and the core network 101 (step S102), the radio network controller 102 sends the CM service request to the core network 101 (step S103). Then, the authentication and security procedures are performed between the core network 101 and the radio network controller 102, between the radio network controller 102 and the first base transceiver station 103a, between the first base transceiver station 103a and the second base transceiver station 103b, between the second base transceiver station 103b and the first extension device 106a, and between the first extension device 106a and the mobile station (mobile terminal) 401, respectively (step S104).

Next, the mobile station (mobile terminal) 401 transmits the CC setup (step S105). The CC setup message is transferred to the first base transceiver station 103a, via the first extension device 106a and the second base transceiver station 103b, transferred to the radio network controller 102 from the first base transceiver station 103a, and transmitted to the core network 101.

In response, after confirming the transmission contents, the core network 101 returns the call proceeding (step S106). The call proceeding message is transferred to the second base transceiver station 103b, via the radio network controller 102 and the first base transceiver station 103a, and transmitted to the mobile station (mobile terminal) 401, via the second base transceiver station 103b, and the first extension device 106a.

Next, the core network 101 transmits the RAB assignment request to the radio network controller 102 (step S107). Upon receiving the RAB assignment request, the radio network controller 102 transmits the radio link reconfiguration prepare to the first base transceiver station 103a (step S108). Then, the first base transceiver station 103a transfers the radio link reconfiguration prepare to the second base transceiver station 103b (step S109).

Upon receiving the radio link reconfiguration prepare, the second base transceiver station 103b returns the radio link reconfiguration ready to the first base transceiver station 103a (step S110). Next, as shown in FIG. 15, the first base transceiver station 103a returns the radio link reconfiguration ready to the radio network controller 102 (step S111). As a result, the user bearer AAL-2 link is established between the core network 101 and the radio network controller 102 and between the radio network controller 102 and the first base transceiver station 103a, respectively (step S112).

Next, the radio network controller 102 instructs the mobile station (mobile terminal) 401 to set up the user radio bearer (step S113). The instruction message is transferred to the second base transceiver station 103b, via the first base transceiver station 103a, and transmitted to the mobile station (mobile terminal) 401 from the second base transceiver station 103b, via the first extension device 106a.

Upon receiving the instruction, the mobile station (mobile terminal) 401 widens the radio bearer so as to be used the user radio bearer and returns the user radio bearer setup complete (step S114). The completion message is transferred to the first base transceiver station 103a, via the first extension device 106a and the second base transceiver station 103b, and transmitted to the radio network controller from the first base transceiver station 103a.

Next, the radio network controller 102 transmits the RAB assignment response to the core network 101 (step S115). In response, the core network 101 notifies the mobile station (mobile terminal) 401 of a call, via the radio network controller 102, the first base transceiver station 103a, the second base transceiver station 103b, and the first extension device 106a (step S116).

Then, the connection instruction message due to response from other party terminal is exchanged between the mobile station (mobile terminal) 401 and the first extension device 106a, between the first extension device 106a and the second base transceiver station 103b, between the second base transceiver station 103b and the first base transceiver station 103a, between the first base transceiver station 103a and the radio network controller 102, and between the radio network controller 102 and the core network 101, respectively (step S117). Next, communication starts (step S118). When starting communication, the control data and the user data are transmitted through the radio network controller 102, the first base transceiver station 103a, the second base transceiver station 103b, and the first extension device 106a, between the core network 101 and the mobile station (radio mobile station) 401.

The cell A 201 information, and the control data and the user data of the mobile station (mobile terminal) 401 are transmitted from the first base transceiver station 103a to the radio network controller 102, as are transmitted conventionally. Therefore, the radio network controller 102 acknowledges these information and data as information related to the mobile station (mobile terminal) 401, as are acknowledged conventionally. The call procedure when the shared channels, the individual control channels, and the individual traffic channels use the resources of the same base transceiver station is the same as the conventional procedure, and therefore, explanations are omitted.

Figure 16:
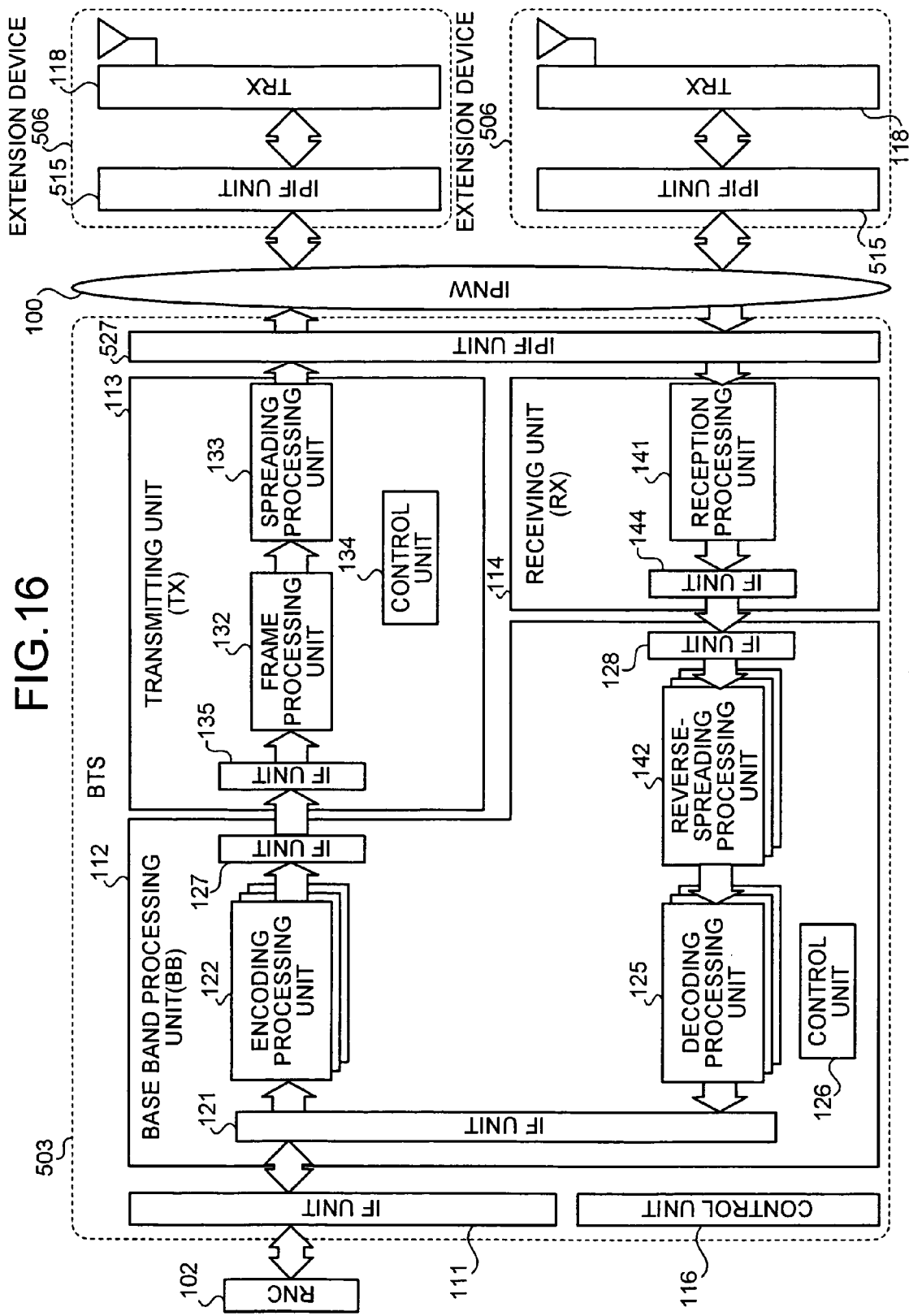
FIG. 16 is a schematic of a base transceiver station and an extension device in a mobile radio communication system according to a third embodiment of the present invention.
Figure 17:
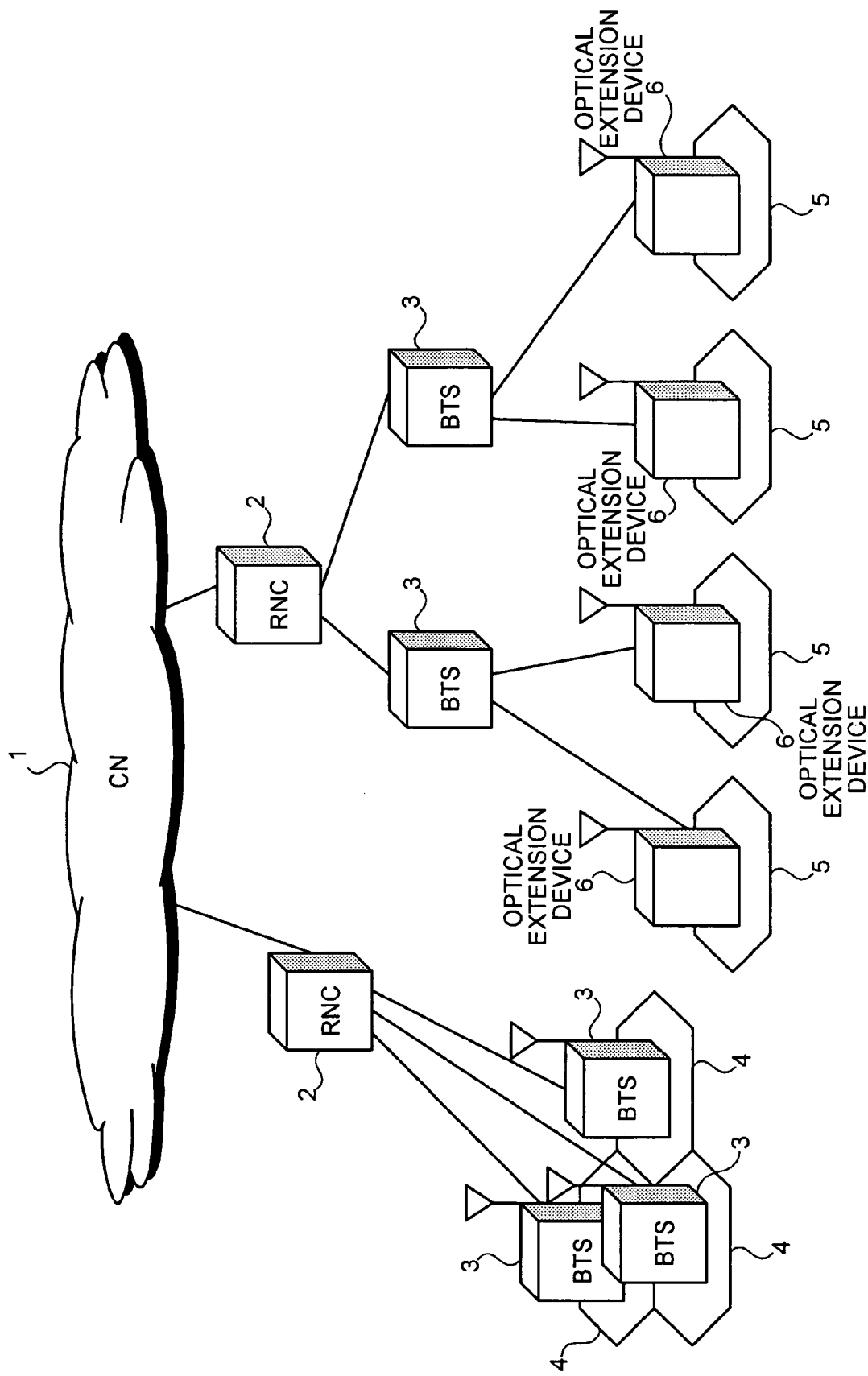
FIG. 17 is a schematic of a conventional mobile radio communication system.
Figure 18:
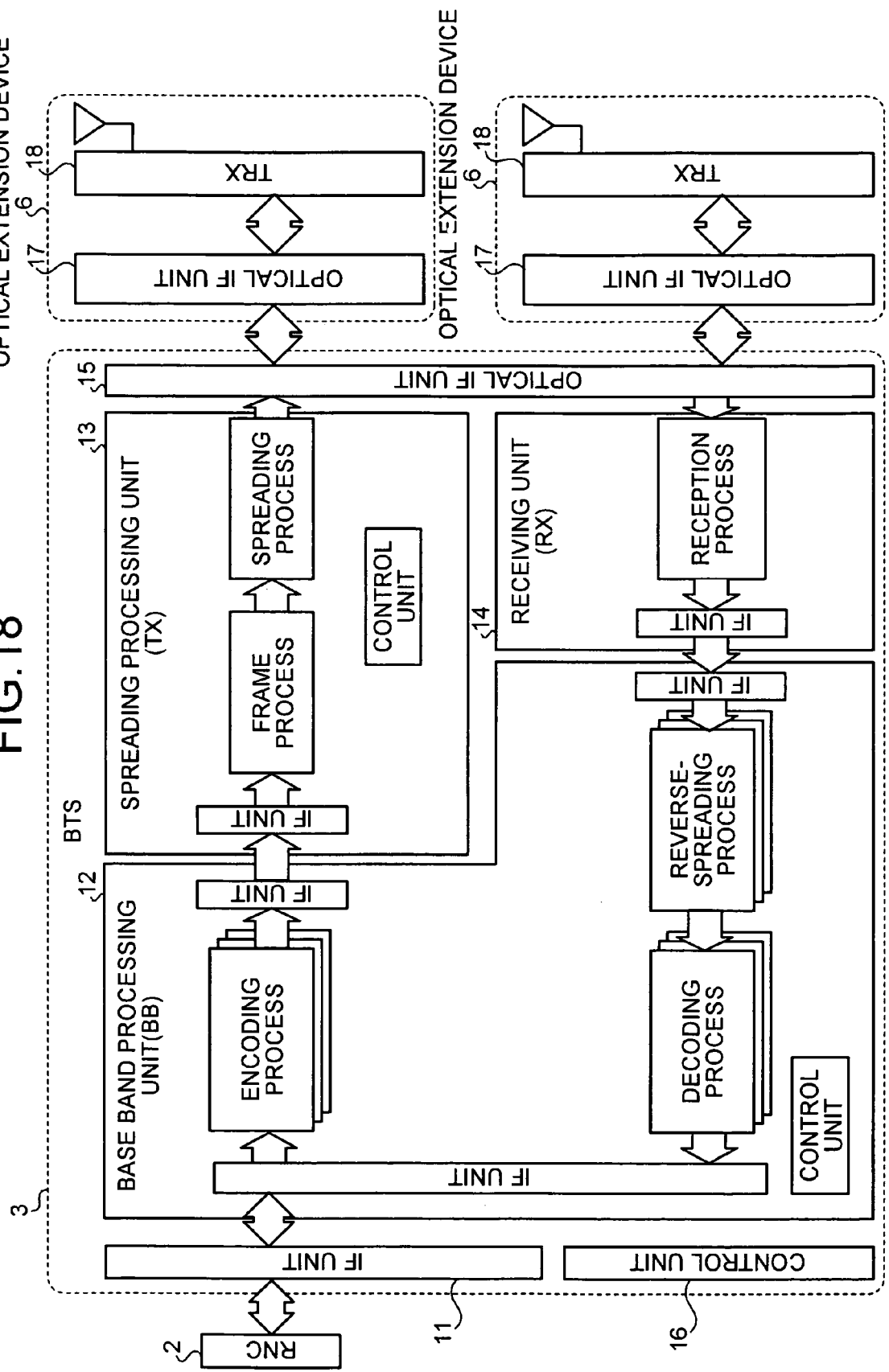
FIG. 18 is a schematic of a base transceiver station and an optical extension device in the conventional mobile radio communication system.

FIG. 16 is a schematic of the base transceiver station and the extension device in the mobile radio system according to a third embodiment of the present invention. As shown in FIG. 16, in the third embodiment, the spreading processing unit 133 and the reverse-spreading processing unit 142 are provided in a base transceiver station (BTS) 503 not in an extension device 506, as in the conventional system. The base transceiver station 503 and the extension device 506 are connected to the IP network 100, via respective IO interface (IPIF) units 527 and 515.

In addition, the base band processing unit 112, the transmitting unit 113, and the receiving unit 114 respectively include interface units 127 and 128, an interface unit 135, and an interface unit 144. The call procedure when the radio network controller 102 manages the assignment of the resources of the base transceiver station 503 is the same as the procedure in the first embodiment. In addition, the call procedure when the base transceiver station 503 manages the resource assignments is the same as the procedure in the second embodiment. Therefore, the explanations of the procedures are omitted.

Furthermore, although the CDMA technology is given as the example in the present embodiment, when other communication methods, such as OFDM technology, are applied, the frame processing unit 132 and the spreading processing unit 133 can also perform one process as a modulation processing unit. The reception process 141 can be the demodulation processing unit, as well. In addition, the reverse-spreading processing unit 142 is not required.

As described above, according to the first to third embodiments, if the resources of one base transceiver station 103 and 503 cannot be assigned to all channels 301, 302, and 303, established between the mobile station (mobile terminal) 401, the resources of two or more base transceiver stations 103a and 103b can be assigned to the channels 301, 302, and 303. Therefore, satisfactory service quality can be ensured even when the amount of traffic increases.

In addition, the resources are not required to be manually increased and decrease depending on the traffic distribution. Moreover, resource redundancy can be prevented even when the amount of traffic decreases due to the resources changing dynamically depending on the traffic distribution. As a result, communication costs can be reduced. In addition, the extension devices 106 and 506 and the IP network 100 can be connected by a metal circuit, such as a phone line. Therefore, the extension devices 106 and 506 can be installed at a low cost in areas in which optical cables cannot be laid, thereby allowing operation to be performed at a low cost. The present invention is not limited to mobile phone services and can be applied to other mobile radio systems.

According to the embodiments described above, it is possible to ensure satisfactory service quality corresponding to fluctuations in traffic distribution. Moreover, it is possible to reduce communication costs, and to operate a communication system at a low cost.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A radio communication system comprising:
   a mobile terminal;
   a plurality of base transceiver stations (BTSs) each of which has resources used to perform communication processing when the mobile terminal communicates with a core network;
   at least one extension device which has a function of performing radio communication with the mobile terminal on behalf of the BTSs, the extension device communicating with the BTSs via an internet protocol network; and
   a control device configured to control the BTSs, wherein
   the extension device is configured to use the resources of more than one of the BTSs concurrently when the mobile terminal communicates with the core network,
   when the mobile terminal communicates with the core network via the extension device, one of the BTSs (hereinafter, "first BTS") assigns, to resources thereof, a part of a plurality of channels established between the mobile terminal and the core network, and transfers to another one of the BTSs (hereinafter, "second BTS"), a resource assignment instruction to assign other channels established between the mobile terminal and the core network to resources of the second BTS, and
   the control device is configured to assign a plurality of channels established between the mobile terminal and the core network, to the resources of the first BTS and the second BTS, and to handle pieces of information processed by the resources of the first BTS and the second BTS as information of a single mobile terminal, when the mobile terminal communicates with the core network.

2. The radio communication system according to claim 1, wherein the control device is configured to divide, into a plurality of groups, the BTSs in subordination to the control device to manage the BTSs, and to assign the channels to resources of BTSs that belong to an identical group from among the groups.

3. The radio communication system according to claim 1, wherein the control device is configured to divide, into a plurality of groups, the BTSs in subordination to the control device to manage the BTSs, and to assign the channels to resources of BTSs that belong to different groups.

4. The radio communication system according to claim 1, wherein
when the extension device is provided in plurality, the BTSs are configured to divide, into a plurality of groups, the extension devices to manage the extension devices, and
the control device is configured to assign the channels to resources of at least two BTSs that are linked to an identical group from among the groups.

5. The radio communication system according to claim 1, wherein
the BTSs are divided into a plurality of groups to be managed, and
the channels are assigned to resources of BTSs that belong to an identical group from among the groups.

6. The radio communication system according to claim 1, wherein
the BTSs are divided into a plurality of groups to be managed, and
the channels are assigned to resources of BTSs that belong to different groups.

7. The radio communication system according to claim 1, wherein when the extension device is provided in plurality, the BTSs are configured to divide the extension devices into a plurality of groups to manage the extension devices, and to assign the channels to resources of at least two BTSs that are linked to an identical group from among the groups.

8. The radio communication system according to claim 1, wherein the BTSs are configured to exchange control information among the BTSs via the internet protocol network.

9. A BTS used in the radio communication system according to claim 1, the BTS comprising:
an interface configured to couple the BTS to the internet protocol network; and
a base band processor configured to perform an encoding process on transmission data and a decoding process on reception data.

10. A BTS used in the radio communication system according to claim 1, the BTS comprising:
an interface configured to couple the BTS to the internet protocol network;
a base band processor configured to perform an encoding process on transmission data and a decoding process on reception data; and
a bypass processor to communicate with another BTS via the internet protocol network.

11. A BTS used in the radio communication system according to claim 1, the BTS comprising:
an interface configured to couple the BTS to the internet protocol network;
a base band processor configured to perform an encoding process on transmission data and a reverse-spreading process and a decoding process on reception data;

a spreading processor configured to perform a spreading process on the transmission data; and
a receiver configured to perform a reception processing on the reception data.

12. An extension device used in the radio communication system according to claim 1, the extension device comprising:
an internet protocol interface configured to couple the extension device to the internet protocol network;
a radio transceiver configured to perform radio communication with the mobile terminal;
a spreading processor configured to perform a spreading process on transmission data; and
a receiver configured to perform a reception process and a reverse-spreading process on reception data.

13. An extension device used in the radio communication system according to claim 1, the extension device comprising:
an internet protocol interface configured to couple the extension device to the internet protocol network;
a radio transceiver configured to perform radio communication with the mobile terminal;
a spreading processor configured to perform a spreading process on transmission data; and
a receiver configured to perform a reception process and a reverse-spreading process on reception data.

14. An extension device used in the radio communication system according to claim 1, the extension device comprising:
an internet protocol interface configured to couple the extension device to the internet protocol network; and
a radio transceiver configured to perform radio communication with the mobile terminal.

15. A radio communication system comprising:
a user equipment;
a radio network controller connected to a core network;
a first base transceiver station (BTS) and a second BTS connected to the radio network controller;
an extension device that communicates with the user equipment on behalf of the first BTS and the second BTS and communicates with the first BTS and the second BTS via an internet protocol network; and
a control device configured to control the first BTS and the second BTS, wherein
the extension device is configured to use the first BTS and the second BTS concurrently in relaying communication between the radio network controller and the user equipment,
when the mobile terminal communicates with the core network via the extension device, the first BTS assigns, to resources thereof, a part of a plurality of channels established between the mobile terminal and the core network, and transfers to the second BTS, a resource assignment instruction to assign other channels established between the mobile terminal and the core network to resources of the second BTS, and
the control device is configured to assign a plurality of channels established between the mobile terminal and the core network, to resources of the first BTS and the second BTS, and to handle pieces of information processed by the resources of the first BTS and the second BTS as information of a single mobile terminal, when the mobile terminal communicates with the core network.

* * * * *